US009381589B2

(12) United States Patent
Arakawa et al.

(10) Patent No.: US 9,381,589 B2
(45) Date of Patent: Jul. 5, 2016

(54) WIRE ELECTRIC DISCHARGE MACHINING METHOD AND WIRE ELECTRIC DISCHARGE MACHINE FOR MACHINING TOOL THAT USES ULTRA-HARD MATERIAL AND IS MOUNTED TO ROTATING SHAFT

(75) Inventors: Yasuo Arakawa, Yamanishi (JP); Yushi Takayama, Yamanishi (JP)

(73) Assignee: FANUC CORPORATION, Yamanashi (JP)

( * ) Notice: Subject to any disclaimer, the term of this patent is extended or adjusted under 35 U.S.C. 154(b) by 864 days.

(21) Appl. No.: 13/611,453

(22) Filed: Sep. 12, 2012

(65) Prior Publication Data

US 2013/0138241 A1 May 30, 2013

(30) Foreign Application Priority Data

Nov. 28, 2011 (JP) ................................. 2011-259487

(51) Int. Cl.

*B23H 7/20* (2006.01)
*B23H 7/06* (2006.01)
*G01B 7/008* (2006.01)
*B23H 9/00* (2006.01)
*B23H 9/08* (2006.01)
*B23H 7/02* (2006.01)

(52) U.S. Cl.

CPC .. *B23H 7/06* (2013.01); *B23H 9/00* (2013.01); *B23H 9/08* (2013.01); *G01B 7/008* (2013.01); *B23H 7/02* (2013.01); *B23H 7/20* (2013.01); *G05B 2219/37444* (2013.01); *G05B 2219/37452* (2013.01)

(58) Field of Classification Search

USPC .......................................................... 700/162
See application file for complete search history.

(56) References Cited

U.S. PATENT DOCUMENTS 4,970,362 A * 11/1990 Ono ....................... B23H 7/065 219/69.12
5,326,954 A 7/1994 Lenard et al.
(Continued)

FOREIGN PATENT DOCUMENTS

CN 1141224 A 1/1997
CN 1155863 A 7/1997
(Continued)

OTHER PUBLICATIONS

Norinari et al "JP 11267925 Machine Translation", Oct. 5, 1999, pp. 18.*
(Continued)

*Primary Examiner* — Kenneth M Lo
*Assistant Examiner* — Olivia Lopez Alvarez
(74) *Attorney, Agent, or Firm* — Hauptman Ham, LLP

(57) ABSTRACT

An ultra-hard material fixed to a cutting tool is formed into a cutting blade by electric discharge machining. The wire electric discharge machine has a rotating shaft to which the cutting tool is mounted, and has a touch sensor mounted to an upper wire guide. A measurement program is generated on the basis of a machining path instructed by the machining program. A machining program is regenerated from rotating shaft coordinate information and path coordinate position information obtained at measurement points, on the basis of the measurement program. As a result, a rake face position of the cutting tool can be accurately measured and a wire electrode can be positioned accurately with respect to that position during machining.

8 Claims, 17 Drawing Sheets

(56) References Cited

U.S. PATENT DOCUMENTS

| | | | | | |
|---|---|---|---|---|---|
| 5,419,222 | A * | 5/1995 | Bieg | 82/1.11 |
| 5,897,791 | A | 4/1999 | Hayakawa | |
| 5,923,561 | A * | 7/1999 | Higasayama et al. | 700/186 |
| 6,912,446 | B2 * | 6/2005 | Wang et al. | 700/193 |
| 7,852,031 | B2 * | 12/2010 | Hon et al. | 318/572 |
| 8,176,825 | B1 * | 5/2012 | Isaacson et al. | 83/835 |
| 8,637,785 | B2 * | 1/2014 | Abe et al. | 219/69.12 |
| 2004/0088874 | A1 * | 5/2004 | Sohn et al. | 33/554 |
| 2004/0105576 | A1 * | 6/2004 | Inomata | 382/141 |
| 2004/0172154 | A1 * | 9/2004 | Maki | 700/162 |
| 2006/0253846 | A1 * | 11/2006 | Ogata et al. | 717/151 |
| 2006/0265876 | A1 | 11/2006 | Kimura et al. | |
| 2008/0051927 | A1 * | 2/2008 | Prestidge et al. | 700/195 |
| 2008/0082202 | A1 * | 4/2008 | Hasebe et al. | 700/186 |
| 2008/0184579 | A1 * | 8/2008 | McFarland | 33/551 |
| 2008/0251500 | A1 * | 10/2008 | Hiraga et al. | 219/69.12 |
| 2009/0292503 | A1 * | 11/2009 | Hon et al. | 702/168 |
| 2010/0018069 | A1 * | 1/2010 | Ould et al. | 33/503 |
| 2010/0030368 | A1 * | 2/2010 | Hon et al. | 700/195 |
| 2010/0101105 | A1 * | 4/2010 | Hon et al. | 33/503 |
| 2012/0215334 | A1 * | 8/2012 | Tanuma et al. | 700/97 |
| 2013/0211577 | A1 * | 8/2013 | Yamane et al. | 700/186 |
| 2015/0051727 | A1 * | 2/2015 | Hasegawa | 700/162 |

FOREIGN PATENT DOCUMENTS

| | | | | | |
|---|---|---|---|---|---|
| JP | 6085830 | A | 5/1985 | |
| JP | 7-299632 | A | 11/1995 | |
| JP | 9-267219 | A | 10/1997 | |
| JP | 11-267925 | A | 10/1999 | |
| JP | 11-277341 | A | 10/1999 | |
| JP | 11267925 | A | 10/1999 | |
| JP | 2000353006 | * | 12/2000 | B23Q 15/00 |
| JP | 2003048125 | A | 2/2003 | |
| JP | 2003-117733 | A | 4/2003 | |
| JP | 2005-335018 | A | 12/2005 | |
| JP | 2008044033 | * | 2/2008 | B23H 7/02 |
| JP | 4400309 | B2 | 1/2010 | |
| JP | 201291281 | * | 5/2012 | B23H 9/00 |
| WO | WO 2011052800 | * | 5/2011 | |

OTHER PUBLICATIONS

Office Action corresponding to JP2011-259487, dated Jan. 8, 2013. pp. 4.

European Search Report for Application No. EP 12183839 completed Mar. 8, 2013 p. 5.

Office Action mailed Feb. 7, 2014, corresponds to Chinese patent application No. 201210435855.8 pp. 5.

* cited by examiner

FIG. 9

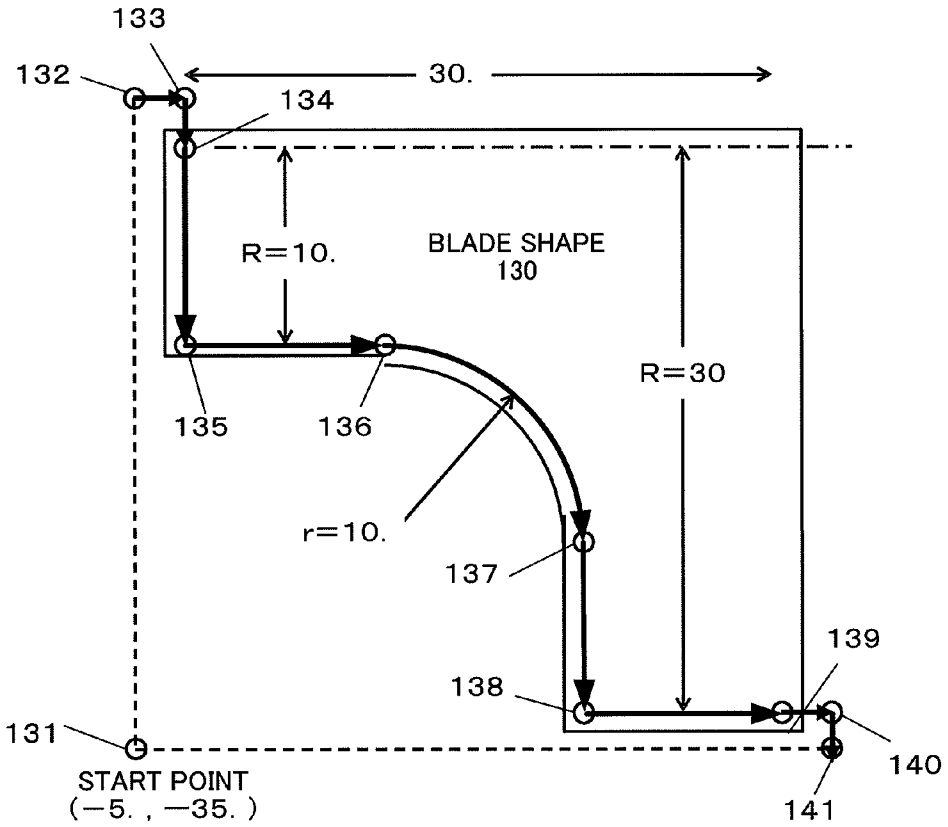

FIG. 10

| | |
|---|---|
| G92X-5.Y-35. | START POINT |
| G90G00X-5.Y5. | POSITIONING OF MACHINING START |
| G01G42X0.Y5. | OFFSET |
| G01X0.Y0. | CUT-IN |
| G101X0.Y-10. | MEASUREMENT SITE INSTRUCTION (STRAIGHT LINE) |
| G101X10.Y-10. | MEASUREMENT SITE INSTRUCTION (STRAIGHT LINE) |
| G102X20.Y-20.I0.J-10. | MEASUREMENT SITE INSTRUCTION (CIRCULAR ARC) |
| G101X20.Y-30. | MEASUREMENT SITE INSTRUCTION (STRAIGHT LINE) |
| G101X30.Y-30. | MEASUREMENT SITE INSTRUCTION (STRAIGHT LINE) |
| G01X35.Y-30. | CUT-THROUGH |
| G00G40X35.Y-35. | CANCEL OFFSET |
| G00X-5.Y-35. | RETURN TO START POINT |
| M30 | END |

FIG. 11

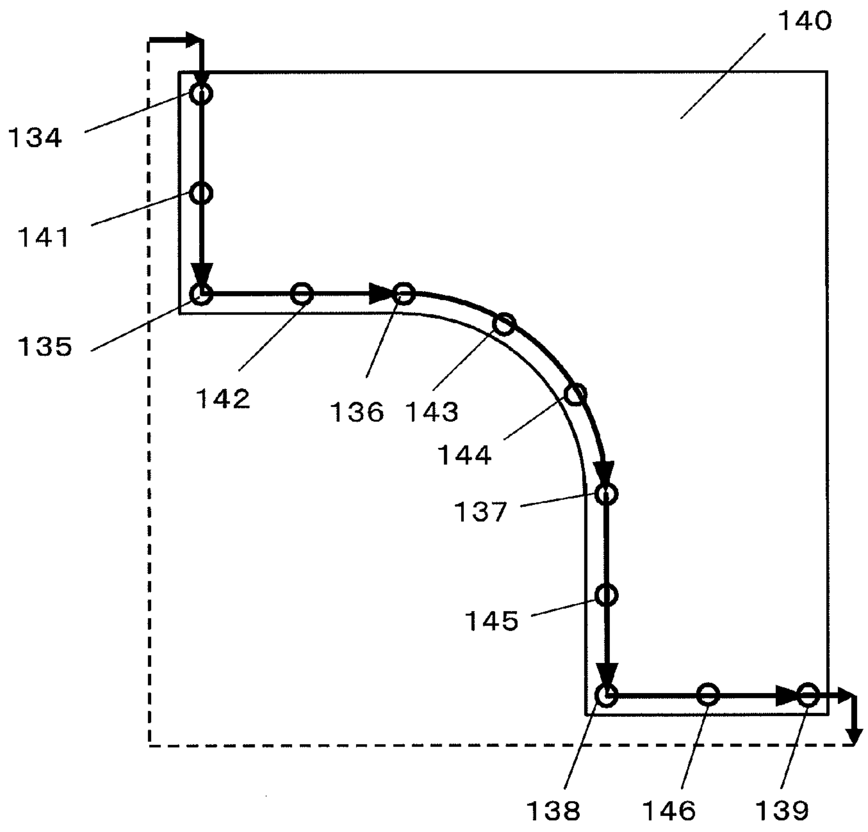

FIG. 12

| | |
|---|---|
| G92X-5.Y-35. | START POINT |
| G90G00X-5.Y5. | POSITIONING OF MACHINING START |
| G01G42X0.Y5. | OFFSET |
| G01X0.Y0. | CUT-IN |
| G101X0.Y-10. | MEASUREMENT SITE INSTRUCTION (STRAIGHT LINE, 2 DIVISIONS) |
| G101X10.Y-10. | MEASUREMENT SITE INSTRUCTION (STRAIGHT LINE, 2 DIVISIONS) |
| G102X20.Y-20.I0.J-10. | MEASUREMENT SITE INSTRUCTION (CIRCULAR ARC, 3 DIVISIONS) |
| G101X20.Y-30. | MEASUREMENT SITE INSTRUCTION (STRAIGHT LINE, 2 DIVISIONS) |
| G101X30.Y-30. | MEASUREMENT SITE INSTRUCTION (STRAIGHT LINE, 2 DIVISIONS) |
| G01X35.Y-30. | CUT-THROUGH |
| G00G40X35.Y-35. | CANCEL OFFSET |
| G00X-5.Y-35. | RETURN TO START POINT |
| M30 | END |

```
G92X-5.Y-35.
G90G00X-5.Y5.
G01G42X0.Y5.A10.
G01X0.Y0.A10.
G01X0.Y-5.A10.1
G01X0.Y-10.A10.2
G01X5.Y-10.A12.
G01X10.Y-10.A14.
G02X15.Y-11.340I0.J-10.A15.5
G02X18.66Y-15.I-5.J-8.66  A17.5
G02X20.Y-20.I-8.66J-5.1A18.
G01X20.Y-25.A18.1
G01X20.Y-30.A18.2
G01X25.Y-30.A20.2
G01X30.Y-30.A22.2
G01X35.Y-30.A24.
G00G40X35.Y-35.
G00X-5.Y-35.
M30
```

```
G92X-5.Y-35.
G90G00X-5.Y5.
G01G42X0.Y5.A10.
G01X0.Y0.A10.
G01X0.Y-10.A10.2
G01X10.Y-10.A14.          ROTATING AXIS A=14.
G02X20.Y-20.I0J-10.A18.   ROTATING AXIS A=18.
G01X20.Y-30.A18.2
G01X30.Y-30.A22.2
G01X35.Y-30.A24.
G00G40X35.Y-35.
G00X-5.Y-35.
M30
```

FIG. 17

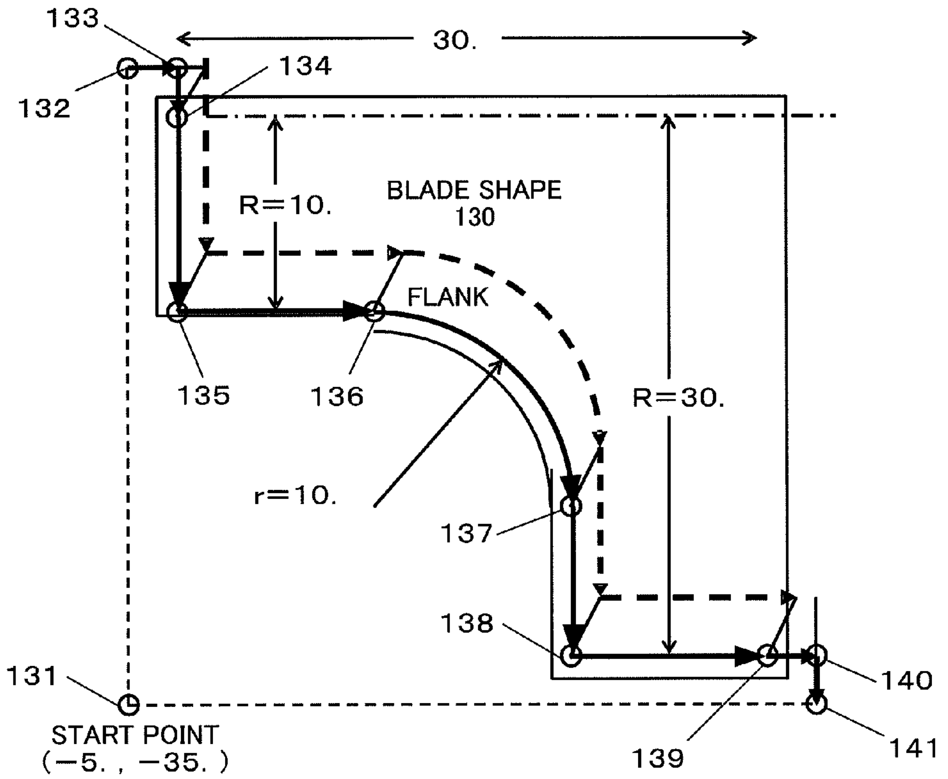

FIG. 18

| | |
|---|---|
| G92X-5.Y-35. | START POINT |
| G90G00X-5.Y5. | POSITIONING OF MACHINING START |
| G01G42X0.Y5.G52T5. | OFFSET, TAPER OF 5 DEGREES |
| G01X0.Y0.T5. | CUT-IN, TAPER OF 5 DEGREES |
| G101X0.Y-10. | MEASUREMENT SITE INSTRUCTION (STRAIGHT LINE) TAPER OF 5 DEGREES |
| G101X10.Y-10.T10. | MEASUREMENT SITE INSTRUCTION (STRAIGHT LINE) TAPER OF 10 DEGREES |
| G102X20.Y-20.I0.J-10. | MEASUREMENT SITE INSTRUCTION (CIRCULAR ARC) TAPER OF 10 DEGREES |
| G101X20.Y-30.T5. | MEASUREMENT SITE INSTRUCTION (STRAIGHT LINE) TAPER OF 5 DEGREES |
| G101X30.Y-30.T10. | MEASUREMENT SITE INSTRUCTION (STRAIGHT LINE) TAPER OF 10 DEGREES |
| G01X35.Y-30.T10. | CUT-THROUGH, TAPER OF 10 DEGREES |
| G00G40X35.Y-35.G50 | OFFSET, CANCEL TAPER |
| G00X-5.Y-35. | RETURN TO START POINT |
| M30 | END |

```
G92X-5.Y-35.
G90G00X-5.Y5.
G01G42X0.T5.G52T5.A10.
G01X0.Y0.A10.
G01X0.Y-5.T5.A10.1
G01X0.Y-10.T5.A10.2
G01X5.Y-10.T10.A12.
G01X10.Y-10.T10.A14.
G02X15.Y-11.340I0.J-10.T10.A15.5
G02X18.66Y-15.I-5.J-8.66T10.A17.5
G02X20.Y-20.I-8.66J-5.1T10.A18.
G01X20.Y-25.T5.A18.1
G01X20.Y-30.T5.A18.2
G01X25.Y-30.T10.A20.2
G01X30.Y-30.T10.A22.2
G01X35.Y-30.T10.A24.
G00G40X35.Y-35.G50
G00X-5.Y-35.
M30
```

PROGRAM COORDINATE SYSTEM AND MACHINE AXIS MATCHED

ROTATING SHAFT ANGLE = A

RELIEF ANGLE B

CENTER HEIGHT OF ROTATION SHAFT IN PROGRAM COORDINATE SYSTEM Xp – Yp – Xp

PERPENDICULAR TO MACHINE AXIS

TAPER IN PROGRAM COORDINATE SYSTEM

MACHINE AXES: X, Y, Z

PROGRAM COORDINATE SYSTEM: Xp, Tp, Zp

WIRE ELECTRIC DISCHARGE MACHINING METHOD AND WIRE ELECTRIC DISCHARGE MACHINE FOR MACHINING TOOL THAT USES ULTRA-HARD MATERIAL AND IS MOUNTED TO ROTATING SHAFT

RELATED APPLICATIONS

The present application claims priority from, Japanese Application Number 2011-259487, filed Nov. 28, 2011, the disclosure of which is hereby incorporated by reference herein in its entirety.

BACKGROUND OF THE INVENTION

1. Field of the Invention

The present invention relates to a wire electric discharge machining method and a wire electric discharge machine for high-precision machining of a cutting edge of a rotary-type cutting tool that is mounted with, as a cutting edge, a polycrystalline diamond (PCD) material or polycrystalline cubic boron nitride (PCBN) material, which are the hardest cutting tool materials.

2. Description of the Related Art

Herein, a polycrystalline diamond (PCD) material or polycrystalline cubic boron nitride (PCBN) material, which are the hardest cutting tool materials, is cut out (blanking), in the form of tips, from PCD or PCBN stock, and a brazing material is fused in a high-frequency induction heater, to braze thereby the blanked tip, in the form of a cutting blade, to a tool body.

Cutting (blanking) of the tips out of PCD stock (PCD disc) can be accomplished by wire electric discharge machining, as illustrated in FIG. 23A. The tip shape that is cut out of the PCD stock may be, for instance, rectangular, as illustrated in FIG. 23A, or triangular, as illustrated in FIG. 23B. This applies not only to PCD stock, but to PCBN stock as well. The PCD tip that is cut out as illustrated in FIG. 23A and FIG. 23B is brazed to a tool body through fusion of a brazing material using a high-frequency induction heater, as illustrated in FIG. 24.

In high-precision machining of a cutting edge of a rotary-type cutting tool to which there is mounted, in the form of a cutting edge, a polycrystalline diamond (PCD) material or polycrystalline cubic boron nitride (PCBN) material, which are the hardest cutting tool materials, the materials themselves are extremely hard, and hence the machining operation is difficult. In grinding machining illustrated in FIGS. 25*a-b* where a diamond grindstone is used, grinding must be performed for a prolonged time. Moreover, grindstone wear is significant, and machining efficiency poor, in the case of fine shapes or complex and intricate machining shapes.

As a result, known machining methods for manufacturing PCD tools include electric discharge machining methods in which a PCD material is machined through burning by exploiting phenomena. In this context, discharge polishing machines are also known in which a disc of alloy of copper and tungsten is made into a disc electrode according to a desired PCD tool outline shape, and electric discharge machining is performed thereupon through application of pulsed voltage between the disc electrode and the PCD tool.

However, an expensive disc electrode must be prepared every time, in accordance with the PCD tool shape, and the entire shape must be burned through discharge. The machining time of deep-groove shapes or the like is thus extremely long. Also, a plurality of disc electrodes are required, on account of disc electrode consumption, which is a further factor that drives up the machining unit cost of the tool.

Therefore, PCD tool machining by wire electric discharge machining, in which cutting proceeds along a machining path alone, even for a complex shape, as illustrated in FIG. 26A and FIG. 26B, is a very convenient machining method, since electrode preparation can be dispensed with, and machining time can be shortened.

Upon machining of a cutting blade by wire electric discharge machining, as compared with grinding machining and discharge polishing machining, a relief angle is imparted to the outer peripheral shape of the tool by a wire electrode that is stretched, along a straight line, with respect to the rake face of the PCD tool that is being machined. To that end, flanks must be machined by taper machining with a tilted wire electrode. Therefore, this mandates that the rake face position of the PCD tool be measured accurately, and that a wire electrode be positioned accurately with respect to that position. The operation involved, however, is not easy. If the position of the rake face is not measured accurately, a machining error ensues as a matter of course. This machining error becomes manifest mainly in the form of a rotation radius precision error of the cutting tool, upon rotation of the tool.

How to secure the shape precision of the cutting blade of the tool is a key requirement in terms of obtaining a tool of higher precision and longer life in machining of a cutting tool using a wire electric discharge machine.

Japanese Patent Application Publication No. 11-267925 discloses a technology that involves measuring the rake face of a tool using a touch sensor or the like, and performing machining then on the basis of the measurement result. In the technology disclosed in Japanese Patent Application Publication No. 11-267925, two sites per blade are measured, in the tool radial direction, in order to position the rake face horizontally; then, while keeping the rake face horizontally from that position, the misalignment between the tool center height and the rake face height at that time is calculated, and on the basis of the calculation result, the wire position during machining is corrected through displacement in the radial direction in such a manner that the outermost peripheral diameter of the tip of the blade takes on a desired value.

Japanese Patent Application Publication No. 2003-117733 discloses a machining method in which the rotation angle upon travel across the distance from a machining start point up to a machining ending point is calculated, by arithmetic processing, on the basis of the difference between the rake face height at a position adjusted using an angle indexing device in such a manner that the top face of one end section, being a machining start position of a PCD tip rake face that is mounted to a cutting tool, becomes horizontal according to a dial gauge, and the height of the rake face at the other end section as obtained thereafter by moving the dial gauge to the machining end point at the other end section.

Japanese Patent Application Publication No. 9-267219 discloses a method in which a cutting blade edge section positioned at the outer periphery, in the rotation direction, of the end section of a tool leading end is observed using a microscope mounted to the tool leading end side, to check thereby the positioning, in the rotation direction, of the cutting blade that is to be machined, even though the machining shape of the cutting tool, called a formed shape, is different from the above-described linear shape.

How to secure the shape precision of the cutting blade of the tool is a key requirement in terms of obtaining a tool of higher precision and longer life in machining of a cutting tool using a wire electric discharge machine.

No major problems arise in the case of a machining shape in which the outer peripheral diameter of the shape is constant and the machining shape is a linear shape that is parallel to the tool center axis, for instance in a reamer tool, as in the technology disclosed in the abovementioned Japanese Patent Application Publication No. 11-267925. In the case of cutting tools having complex outer peripheral shapes, in particular circular arc shapes, however, instances arise in which mere correction in the radial direction by circular arc quadrants is inadequate. These circular arc quadrants denote sites at which the rotation radius changes gradually from the rotation center axis (FIG. 4A). In the case of elongated blade shapes, an elongated PCD tip becomes often brazed curvedly, on account of heat during brazing of the PCD tip, so that high tool radius precision cannot be achieved unless this curved portion is measured (FIG. 27).

In the technology disclosed in the above-described Japanese Patent Application Publication No. 2003-117733, the rotation angle is worked out on the basis of the radius and the difference between height and the distance from a machining start point to a machining ending point. Therefore, this method can be used only for a linear shape for which the tool radius does not change. Needless to say, the degree of curving of a long PCD tip that is brazed cannot be worked out accurately even in the case of a linear shape, as in the technology disclosed in Japanese Patent Application Publication No. 11-267925 (FIG. 28), as a result, the associated error translates into a tool radius error, thereby making it difficult to produce a tool with high precision. However, no correction means are provided herein, let alone for a machining shape of a cutting blade having a circular arc shape.

The above-described technology disclosed in Japanese Patent Application Publication No. 9-267219 cannot be used in a cutting tool of which the rake face curves halfway, or of which the rake face is in a raised-center or lowered-center state such that the rake face runs through the tool center line but is not parallel thereto (see Japanese Patent Application Publication No. 11-267925), or in a cutting tool of which the rake face is tilted, as in Japanese Patent Application Publication No. 2003-117733 described above. It is also evident that a rotating tool having a spiral cutting blade, such as the one illustrated in FIG. 28, is difficult to machine, with high precision, in the above machining methods.

SUMMARY OF THE INVENTION

In the light of the above-described problems of conventional art, it is an object of the present invention to provide a wire electric discharge machining method and wire electric discharge machine that allow reducing, as much as possible, measurement error of the position of a rake face, and easing, as much as possible, the work burden of an operator involved in measurement, and that enable machining, easily and with high precision, of a cutting tool to which there is fixed an ultra-hard material, such as a polycrystalline diamond (PCD) material or polycrystalline cubic boron nitride (PCBN) material that is fixed to a rotating shaft.

The wire electric discharge machining method according to the present invention is a method of forming an ultra-hard material that is fixed to a cutting tool, into a cutting blade by performing electric discharge machining on the ultra-hard material according to a machining program by using a wire electric discharge machine having a taper machining function. The wire electric discharge machine is configured such that the cutting tool can move relatively, in two mutually orthogonal axis directions, with respect to a wire electrode that is stretched by an upper wire guide and a lower wire guide, and a touch sensor is mounted to the upper wire guide, the wire electric discharge machine further having a rotating shaft to which the cutting tool is removably mounted. The wire electric discharge machining method comprises: a step of generating a measurement program for setting, along a machining path instructed by the machining program, an origin or endpoint of a block of the machining path, or a midpoint between the origin and the endpoint of the machining path, or each point of a plurality of divisional positions between the origin and the endpoint of the machining path, as a measurement point at which contact between the ultra-hard material and a probe end section of the touch sensor is detected at a rotation center height of the rotating shaft; a step of positioning the probe end section of the touch sensor at the measurement point on the basis of the generated measurement program; a step of causing the rotating shaft, to which the cutting tool is mounted, to rotate in a direction in which a face of the ultra-hard material being fixed to the cutting tool, that forms a tool rake face comes into contact with the probe end section of the touch sensor; a step of reading rotating shaft coordinate information for which the face of the ultra-hard material that forms the tool rake face at the measurement point is at the rotation center height of the rotating shaft, on the basis of a detection signal from the touch sensor obtained when the face that forms the tool rake face comes into contact with the probe end section of the touch sensor; a step of storing path coordinate position information, being coordinate data in the two orthogonal axes at the measurement point, as well as the read rotating shaft coordinate information; a step of regenerating a machining program from the path coordinate position information and the rotating shaft coordinate information that are stored; and a step of forming a cutting blade through wire electric discharge machining of the ultra-hard material by the wire electrode that is stretched by the upper and lower wire guides, according to the regenerated machining program.

The wire electric discharge machine according to the present invention has a rotating shaft and is configured such that a cutting tool that is removably mounted to the rotating shaft can move relatively, in two mutually orthogonal axis directions, with respect to a wire electrode that is stretched by an upper wire guide and a lower wire guide, a touch sensor is mounted to the upper wire guide, and an ultra-hard material that is fixed to the cutting tool is formed into a cutting blade by performing electric discharge machining on the ultra-hard material according to a machining program, the wire electric discharge machine having a taper machining function. The wire electric discharge machine comprises: a measurement program generation unit that generates a measurement program for setting, along a machining path instructed by the machining program, an origin or endpoint of a block of the machining path, or a midpoint between the origin and the endpoint of the machining path, or each point of a plurality of divisional positions between the origin and the endpoint of the machining path as a measurement point at which contact between the ultra-hard material and a probe end section of the touch sensor is detected at a rotation center height of the rotating shaft; a positioning unit that positions the probe end section of the touch sensor at the measurement point on the basis of the generated measurement program; a rotation unit that causes the rotating shaft, to which the cutting tool is mounted, to rotate in a direction in which a face of the ultra-hard material being fixed to the cutting tool, that forms a tool rake face comes into contact with the probe end section of the touch sensor; a reading unit that reads rotating shaft coordinate information for which the face of the ultra-hard material that forms the tool rake face at the measurement point is at the rotation center height of the rotating shaft, on the basis of a detection signal from the touch sensor obtained when the face that forms the tool rake face comes into contact with the probe end section of the touch sensor; a storage unit that stores path coordinate position information, being coordinate data in the two orthogonal axes at the measurement point, as well as the read rotating shaft coordinate information; and a machining program regeneration unit that regenerates a machining program from the path coordinate position information and the rotating shaft coordinate information that are stored in the storage unit; wherein a cutting blade is formed through wire electric discharge machining of the ultra-hard material by the wire electrode that is stretched by the upper and lower wire guides, according to the machining program regenerated by the machining program regeneration unit.

The taper machining function may be a function of performing machining by tilting the wire electrode, by a taper angle, with respect to a plane in which the two axes extend, or a function of performing machining by rotating the rotating shaft by a taper angle to make the wire electrode perpendicular to the plane in which the two axes extend.

The measurement point can be worked out by automatically calculating, in a controller, points resulting from dividing, by an arbitrary number of divisions, an expanse from an endpoint coordinate of each displacement instruction block in the machining path instructed by the machining program up to an endpoint coordinate of a previous displacement instruction block.

The measurement point can be calculated by separating a path that is offset by a machining margin, from the machining path instructed by the machining program.

When working out the measurement point, it may be determined not to perform measurement if an origin of each block of the machining path instructed by the machining program is a cut-in start point from outside the ultra-hard material, or is an endpoint of a machining path extended out of the ultra-hard material, from among endpoint coordinates of the respective blocks of the machining path.

A contactless-type sensor may be used that detects the tool rake face in a contactless manner instead of the touch sensor; a detection section of the contactless-type sensor may be positioned at an origin or endpoint of a block of the machining path, or a midpoint between the origin and the endpoint of the machining path, or each point of a plurality of divisional positions between the origin and the endpoint of the machining path; the rotating shaft may be caused to rotate until the face of the ultra-hard material that forms the tool rake face is at the rotation center height of the rotating shaft on the basis of a detected value outputted by the contactless-type sensor; rotating shaft coordinate information may be read, and the rotating shaft coordinate information and storing path coordinate position information obtained at the positioned point may be stored; and a machining program may be regenerated from the rotating shaft coordinate information and path coordinate position information that are stored.

The present invention succeeds thus in providing a wire electric discharge machining method and wire electric discharge machine that allow reducing, as much as possible, measurement error of the position of a rake face, and easing, as much as possible, the work burden of an operator involved in measurement, and that enable machining, easily and with high precision, of a cutting tool to which there is fixed an ultra-hard material, such as a polycrystalline diamond (PCD) material or polycrystalline cubic boron nitride (PCBN) material that is fixed to a rotating shaft.

BRIEF DESCRIPTION OF THE DRAWINGS

The abovementioned object and features of the present invention, and other objects and features, will become apparent from the explanation of the examples below with reference to accompanying drawings, wherein:

FIG. 9 is a diagram for explaining the creation of a measurement program based on a drawing-designated shape, using a programming device;

FIG. 10 is an example of a measurement program;

FIG. 11 is a diagram for explaining measurement sites for measurement by a measurement program;

FIG. 12 is a diagram for explaining a measurement program;

FIG. 17 is a diagram for explaining measurement sites for measurement by a measurement program that includes a taper machining instruction;

FIG. 18 is a diagram for a measurement program that includes a taper machining instruction;

DETAILED DESCRIPTION OF THE PREFERRED EMBODIMENTS

Figure 1:
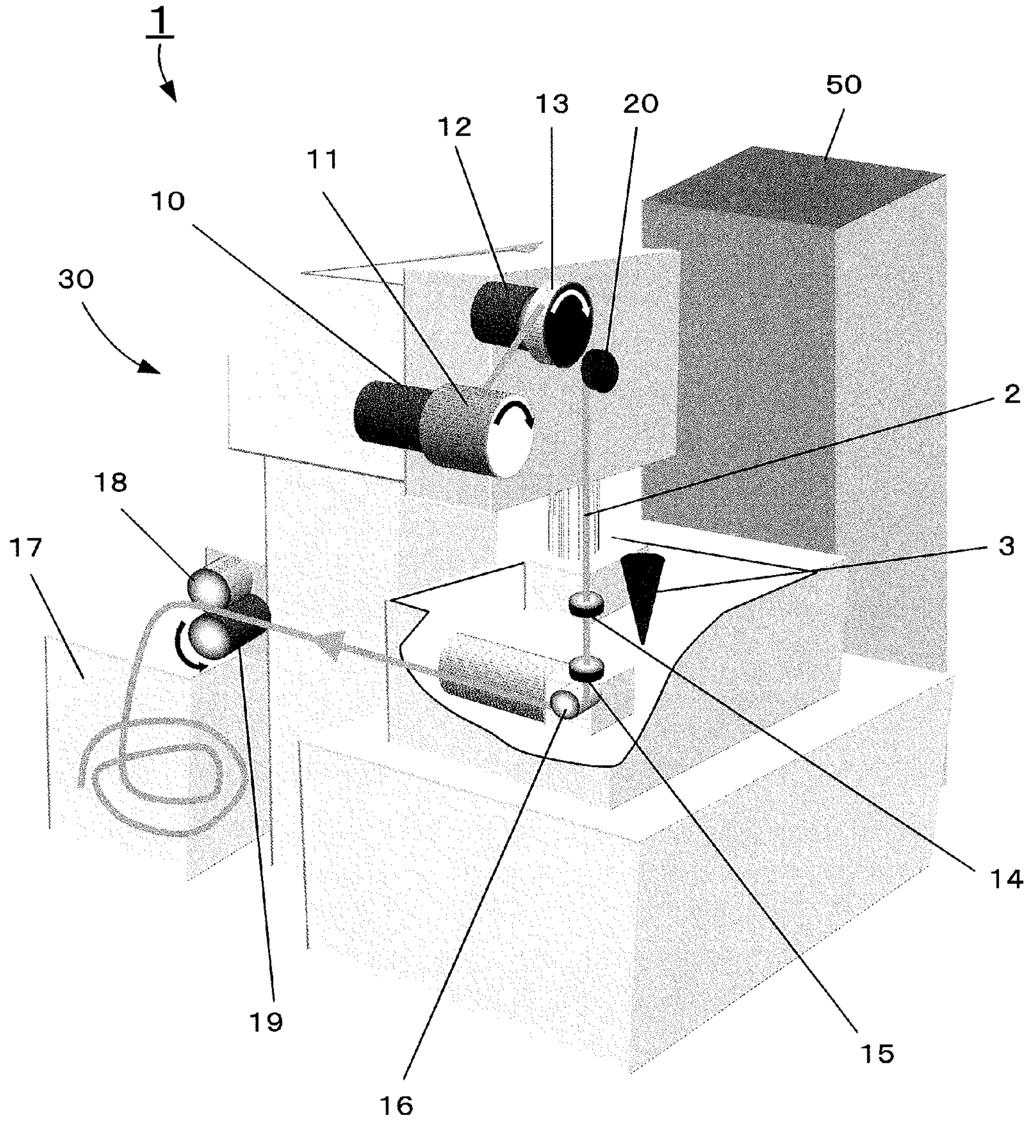
FIG. 1 is a schematic diagram for explaining a wire electric discharge machine according to the present invention.
Figure 2:
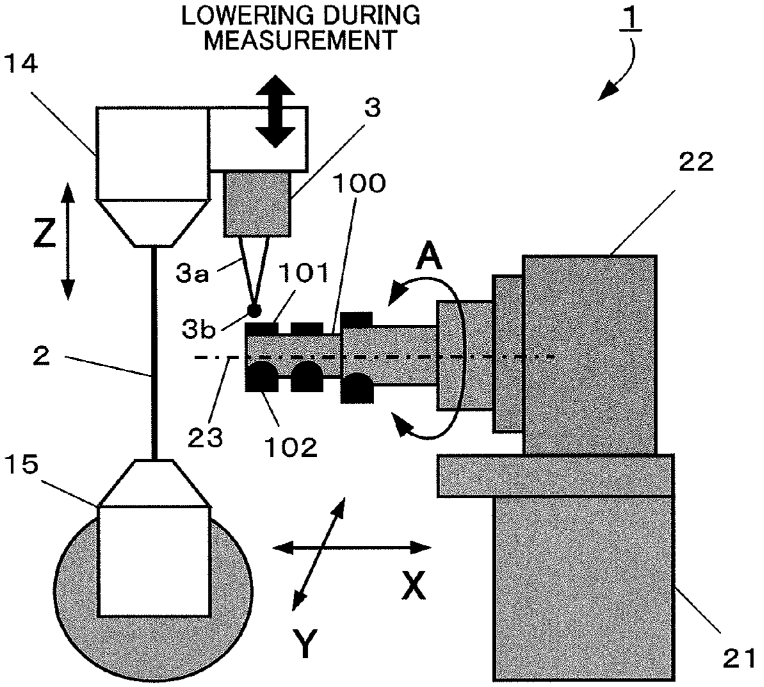
FIG. 2 is a schematic diagram for explaining a wire electric discharge machine, according to the present invention, having a rotating shaft that causes a workpiece to rotate.

FIG. 1 is a schematic diagram for explaining a wire electric discharge machine according to the present invention. FIG. 2 is a schematic diagram for explaining a wire electric discharge machine, according to the present invention, having a rotating shaft that causes a workpiece to rotate.

A wire electric discharge machine 1 comprises a wire electric discharge machine main body 30 and a controller 50 that controls the wire electric discharge machine main body 30. A wire bobbin 11 around which a wire electrode 2 is wound is imparted with an instructed predetermined low torque, in an opposite direction to a draw-out direction of the wire electrode 2, by a feed-out section torque motor 10. The wire electrode 2 that is paid out of the wire bobbin 11 passes along a plurality of guide rollers (not shown), and the tension of the wire electrode 2 is adjusted, by a brake shoe 13 that is driven by a brake motor 12, between the brake shoe 13 and a feed roller 19 that is driven by a wire electrode feed motor (not shown). A tension detector 20 detects the magnitude of the tension of the wire electrode 2 that runs between an upper wire guide 14 and a lower wire guide 15.

The wire electrode 2 that passes round the brake shoe 13 passes through the upper wire guide 14, the lower wire guide 15 and round a lower guide roller 16, is pinched between a pinch roller 18 and the feed roller 19 that is driven by the wire electrode feed motor (not shown), and is collected in a wire electrode collection box 17. A touch sensor 3 is mounted to the upper wire guide 14 in such a manner that the touch sensor 3 can move in a direction (vertical direction) parallel to the running direction of the wire electrode 2, by virtue of an advance and retreat function (not shown). The touch sensor 3 outputs a signal of contact detection when the touch sensor 3 comes into contact with an object to be measured. At times other than during measurement, the touch sensor 3 is withdrawn in a retreat position.

The wire electric discharge machine main body 30 comprises a machining table 21. On the machining table 21 there is mounted a rotating shaft 22 comprising a servo motor that rotates a tool body 100 having fixed thereto a PCD tip 101 of a cutting tool, which is the piece to be worked (workpiece) as shown in FIG. 2. The rotating shaft 22 is mounted to the machining table 21 in such a manner that the center line of the rotating shaft runs in the horizontal direction. The piece to be worked is mounted, in a detachable manner, to the rotating shaft 22, such that the piece to be worked can rotate, about an A-axis, in a manner identical to rotation during cutting of the piece to be worked. The piece to be worked is removed from the rotating shaft 22 once machining is over. The wire electric discharge machine main body 30 causes the piece to be worked to move relatively in the X-axis and Y-axis directions, which are mutually orthogonal, with respect to the wire electrode 2 that is stretched between the upper wire guide 14 and the lower wire guide 15. The piece to be worked can be vertically machined as a result.

The piece to be worked that is mounted to the tool body 100 is an ultra-hard material such as polycrystalline diamond (PCD), polycrystalline cubic boron nitride (PCBN) or the like that is to form the cutting blade of a cutting tool. The upper wire guide 14 is provided with a Z-axis driving mechanism (not shown) that can move in the Z-axis direction, being a direction perpendicular to the plane at which the X-axis and Y-axis are formed. The touch sensor 3 can be lowered in order to position a probe leading end of the touch sensor 3 at a predetermined position during measurement of a measurement site of the piece to be worked using the touch sensor 3. The position of the upper wire guide 14 in the X-axis, Y-axis and Z-axis may be set to be adjustable by providing a U-axis driving mechanism and a V-axis driving mechanism (not shown). Providing such mechanisms enables taper machining of the piece to be worked (cutting tool).

The controller 50 that controls the wire electric discharge machine 1 has a function of measuring, according to a measurement program, and using the touch sensor 3, the position of a face, in the ultra-hard material that is machined, that constitutes a rake face of the cutting blade of the tool to be cut. The measurement program is created, as described below, in the controller 50, using a machining program according to which the ultra-hard material of the cutting tool is machined and formed into a cutting blade by electric discharge machining. The controller 50 has also a function of regenerating a machining program on the basis of information obtained by measurement, and of performing electric discharge machining on the ultra-hard material of the cutting tool according to the regenerated machining program.

Figure 3:
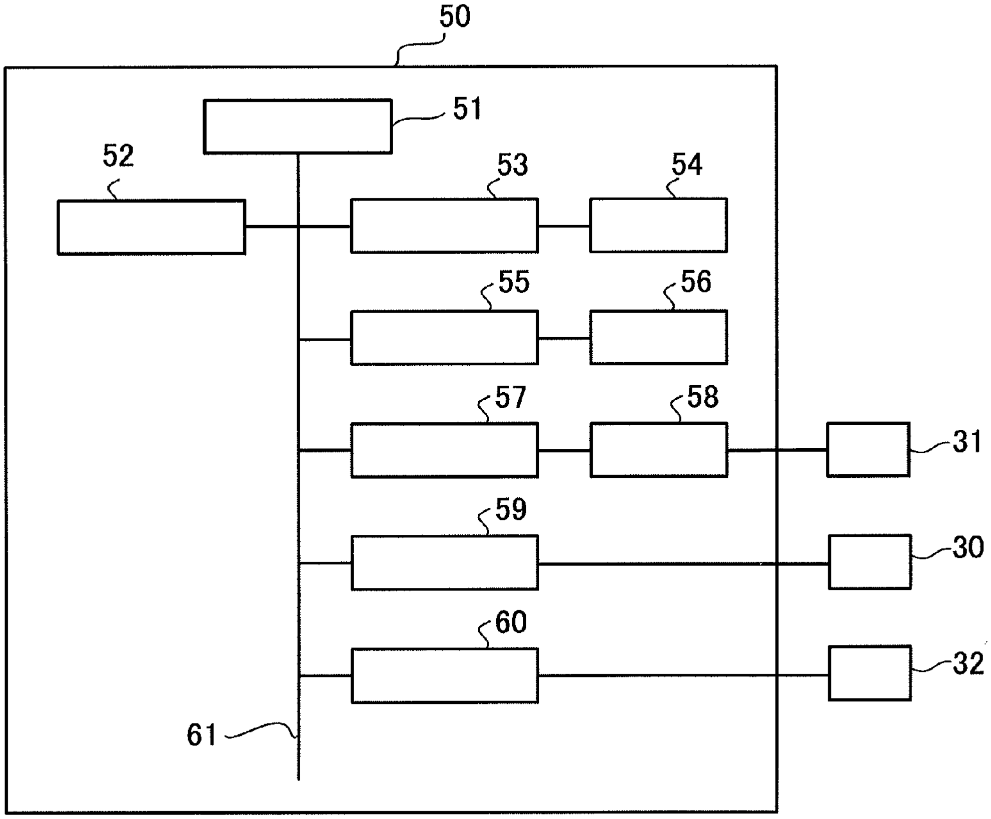
FIG. 3 is a schematic diagram for explaining a controller that controls a wire electric discharge machine main body.

A workpiece is machined at a wire-cut electric discharge machine main body 30 that is controlled by the controller 50 illustrated in FIG. 3. The controller 50 comprises a processor (CPU) 51, a memory 52 such as a RAM, a ROM or the like, a display interface 53, a display device 54, a keyboard interface 55, a keyboard 56, a servo interface 57, a servo amplifier 58 and an input-output interface 60 that exchanges signals with an external device. The above various elements 51 to 60 are connected to each other via a bus 61. The wire-cut electric discharge machine main body 30 comprises a machining power source (not shown). A servo motor 31 is driven by the servo amplifier 58. The servo motor 31 denotes a servo motor corresponding to the various driving axes (of the rotating shaft) i.e. the X-axis, Y-axis, A-axis, and denotes servo motors corresponding to the required driving axes. The servo motor 31 provided for each axis is provided with a position detection device (not shown) for position detection. Position detection signals that are detected by respective position detection devices mounted to the servo motor 31 are fed back to the controller 50.

The wire-cut electric discharge machine main body 30 that comprises the machining power source is controlled through an interface 59. Upon start of the machining program, a machining power source ON instruction is issued via the interface 59. When the machining power source is turned off, the wire-cut electric discharge machine main body 30 receives corresponding instruction via the interface 59. An input-output device 32 exchanges input-output signals via the input-output interface 60.

An explanation follows next on a machining method according to the present invention, wherein a rake face position is measured, and wire electric discharge machining is performed on a cutting tool on the basis of the measurement result.

Figure 4A:
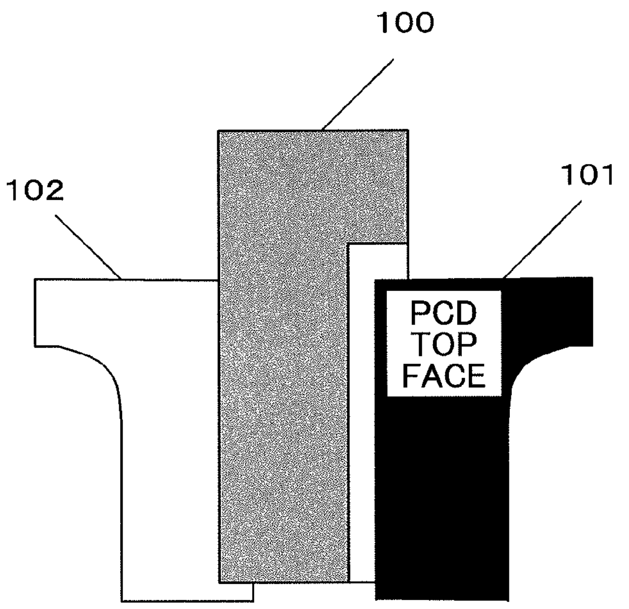
FIG. 4A is a diagram for explaining a cutting tool in which a PCD tip that is fixed, through brazing, to a tool body, is machined by wire electric discharge and formed into a cutting blade.
Figure 4B:
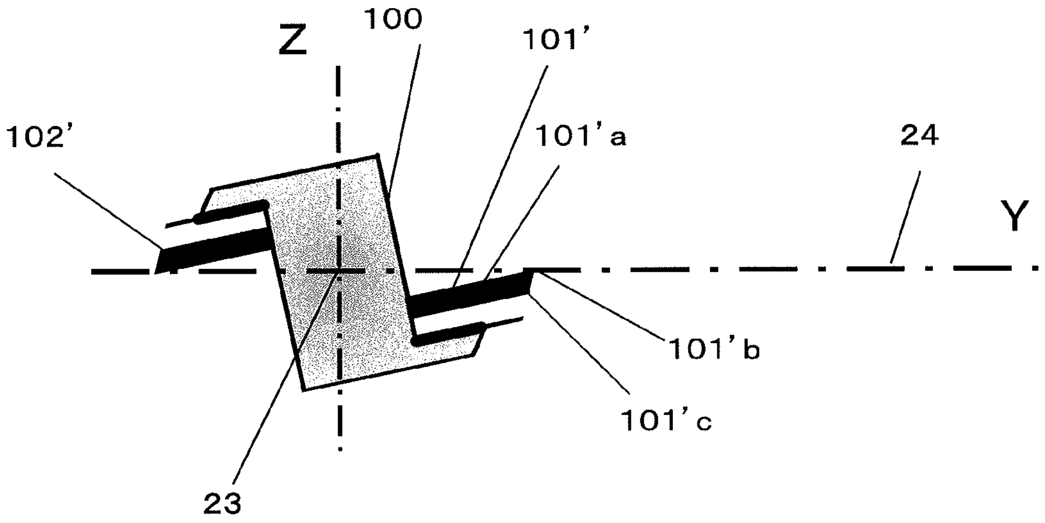
FIG. 4B is a diagram of the tool body and PCD of FIG. 4A viewed from the direction of a rotation center axis thereof.

FIG. 4A is a diagram illustrating wire electric discharge machining of PCD tips 101, 102 that are fixed, through brazing, to the tool body 100, to form the PCD tips 101, 102 into cutting blades 101', 102' (FIG. 4B) of a cutting tool; and FIG. 4B is diagram of the tool body 100 and the PCD tips 101, 102 of FIG. 4A viewed from the direction of a rotation center axis 23.

Figure 5:
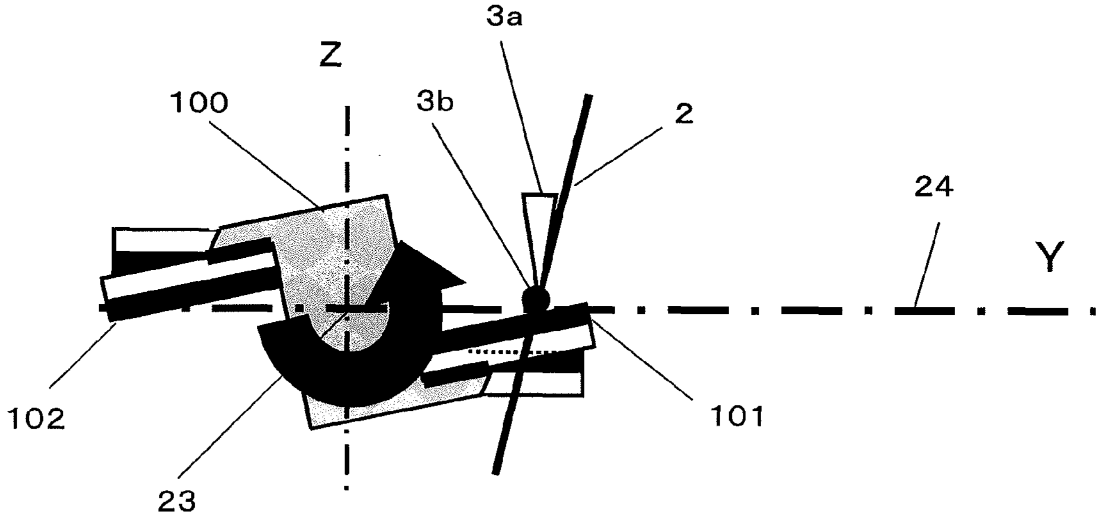
FIG. 5 is a diagram for explaining a PCD tip rake face measurement position by a touch sensor, and for explaining wire electric discharge machining at a measurement site.

In order to machine, with high precision, a cutting tool having a PCD tip brazed thereto, using the wire electric discharge machine 1 as described above, the wire 2 is positioned each time, through driving of the X-axis and Y-axis, at the top face of the PCD tip 101 that yields the tool rake face 101'*a*, along a machining path of a programmed machining shape, in such a manner that the coordinates of the machining path at each point, at a minimum necessary pitch spacing, conform to a shape dimension. Further, machining is performed thereupon through driving of the rotating shaft 22 at that position, and through positioning of the height of the tool rake face 101'*a* at a tool rotation center height 24. As a result, a radius of a leading end 101'*b* (edge section) of the cutting blade that is machined in the wire electric discharge machine 1 conforms to the shape dimension (FIG. 5). The reference numeral 101'*c* denotes a flank.

The height of the rake face 101'*a* is never constant, on account of machining error of the PCD tip mounting face of the tool body 100, and on account of brazing thickness error, and bending of the PCD stock. Of course, if the blade shape itself is spiral, or small stepped tips are arrayed sequentially in the form of a spiral and are tilted so as to yield a multiple-stage spiral shape, with a view to increasing the cutting ability of the leading end 101'*b* of the cutting blade, then the coordinates of the rotating shaft 22 must be read, by way of the touch sensor 3 or the like, together with information on the path coordinates (on the XY plane), in such a manner that the height of the rake face 101'*a* is the tool rotation center height 24, in order to match the height of the rake face 101'*a* that is positioned on the machining path to the tool rotation center height 24, exhaustively along the machining path of each cutting blade.

In the method of the present invention, therefore, the rake face rotating shaft coordinates are not only measured at the origin and the endpoint of an instruction block of the machining path but also measured continuously in intermediate portions at points resulting from division over a minimum necessary pitch desired or minimum necessary number of divisions desired. As a result, accurate rotating shaft coordinates can be obtained at each measurement point, even for a rake face that is mounted obliquely or spirally, in a case where the top face of the PCD tip is curved or is bent on account of mounting error.

As a result, error in the outer peripheral diameter can be reduced significantly, as compared with an instance of measurement at the origin and the endpoint alone, upon rotation of the machined cutting tool. In the case of a polishing machine where grinding is performed by a rotating grindstone, the entire outer periphery is finished to a same radius, irrespective of the curve or bearing of the rake face, through rotation of the cutting tool itself. Therefore, accurate rotating shaft coordinates need not be measured. In the wire electric discharge machine 1, however, it is very important to obtain the machining path position coordinates on the machining shape, as well as accurate information on the rotation angle of the rotating shaft 22 at each coordinate position, in order to precisely determine the machining position at one point of the cutting blade on the rake face of the PCD tip, by way of the wire electrode 2 that runs, in a straight line, between the upper wire guide 14 and the lower wire guide 15.

The machining shape program of a tool by the wire electric discharge machine 1 is ordinarily created in the form of NC text. The NC text is ordinarily created by an operator or programmer, in a program creating device, through reading of a tool drawing. If there is a machining path for the machining shape, then the program can be created easily, unlike in ordinary program creation, by using a commercially-available programming device, or manually. As mentioned above, however, the rake face position of the cutting tool must be measured accurately by the touch sensor 3 that is mounted to the wire electric discharge machine 1. To create the program for measurement (measurement program), cumbersome commands have to be created each time, in which a plurality of measurement sites are set by relying on special know-how and a measurement command is added each time and measurement results are saved. Alternatively, an expensive dedicated programming device had to be used.

In the present invention, the controller 50 automatically generates, internally, a program for measurement (measurement program), through various tool settings by an operator, and by executing a program that results from supplementing, in a simple manner, a machining path program (machining program) with some commands, such as a command that instructs the driving of the rotating shaft 22. The measurement program is executed in the wire electric discharge machine 1, whereupon the NC text for the machining path, in conjunction with the rotating shaft 22, is automatically generated on the basis of the information obtained through measurement at each measurement point. The burden of the operator can be eased as a result.

<Measurement of the Rake Face Position by the Touch Sensor, And Wire Electric Discharge Machining at Measurement Sites>

An explanation follows next, with reference to FIG. 5 and FIGS. 6*a*, 6*b*, 6*c*, 6*d*, on measurement of the rake face position by the touch sensor according to the present invention, and on wire electric discharge machining at measurement sites. FIGS. 6*a*, 6*b*, 6*c*, 6*d* are diagrams for explaining FIG. 5 broken down in a time series. The position of the rake face of the cutting tool is measured by the touch sensor 3 according to a measurement program.

The method for creating the measurement program will be explained further on.

To measure the position of the tool rake face, a leading end 3*b* (probe end section) of a probe 3*a* of the touch sensor 3 mounted to the upper wire guide 14 is positioned at a measurement position (state in FIG. 6A) through driving of the X-axis and Y-axis along a path that comprises a sequence of measurement points as instructed by the measurement program. To position the leading end 3*b* of the probe 3*a* of the touch sensor 3, the upper wire guide 14 and the lower wire guide 15 may be driven, to cause thereby the wire electrode 2 to move with respect to the machining table 21. Alternatively, the machining table 21 may be caused to move with respect to the wire electrode 2.

Figure 6:
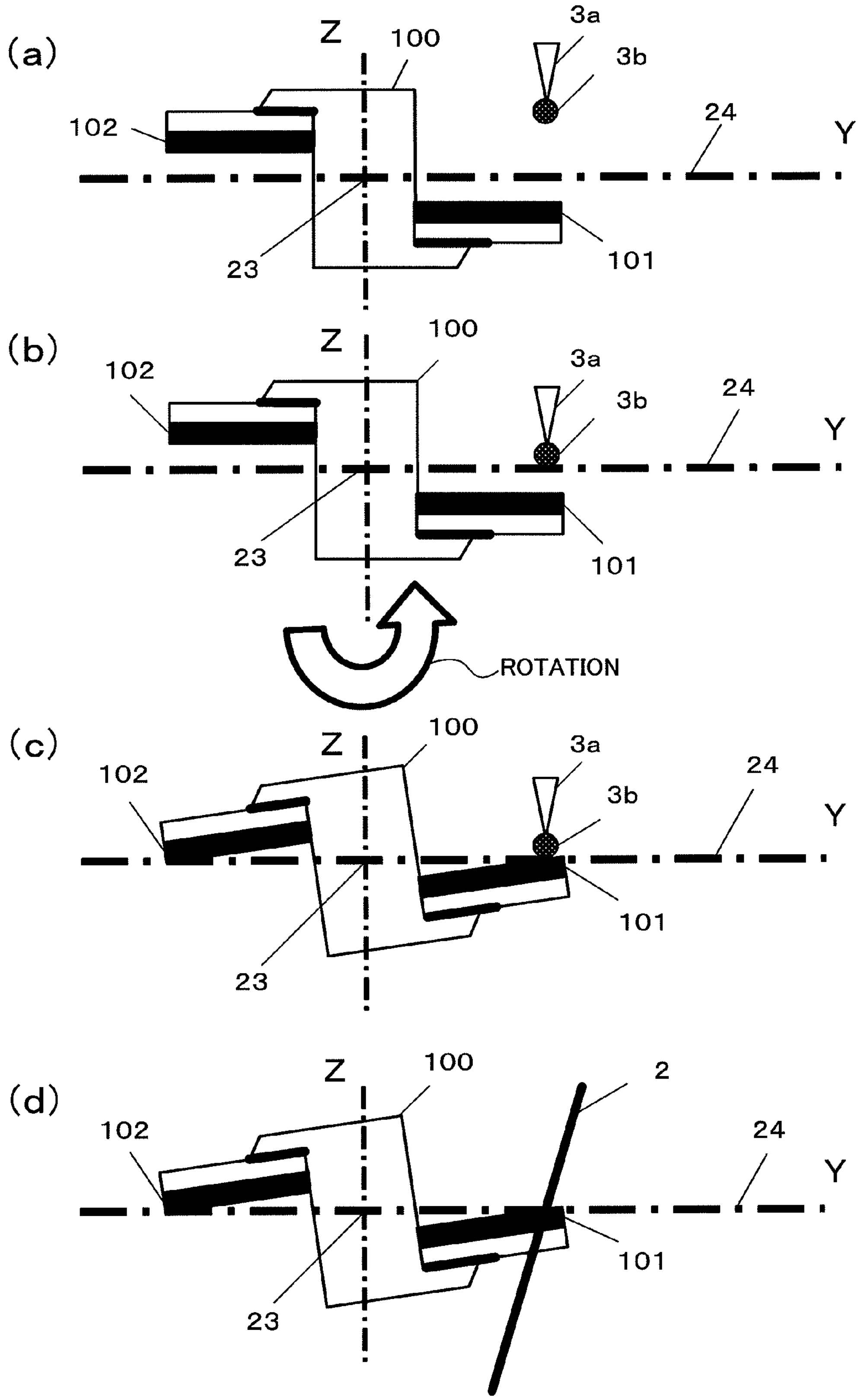
FIGS. 6*a*, 6*b*, 6*c*, 6*d* are diagrams for explaining electric discharge machining in FIG. 5, in a temporal series.

Next, the leading end 3*b* of the probe 3*a* of the touch sensor 3 is lowered and positioned at a rotation center height (i.e. rotation center height of the rotating shaft) of the cutting tool, by a positioning unit (not shown) that moves in the vertical direction (Z-axis direction) (FIG. 6B).

Thereafter, the rotating shaft 22 is caused to rotate, by a rotation unit (not shown), in a direction in which the rake face 101'*a* of the PCD tip 101 comes into contact with the leading end 3*b* of the probe 3*a* of the touch sensor 3 (FIG. 6C).

When the leading end 3*b* of the probe 3*a* comes into contact with the rake face 101'*a* of the PCD tip 101, the touch sensor 3 outputs a detection signal, of contact detection, to the controller 50. The controller 50 reads, by way of a reading unit (not shown), rotating shaft coordinate information of the point in time at which contact is detected, and the information is acquired by the controller 50.

The controller 50 stores rotating shaft coordinate information and path coordinate position information in the X-axis and Y-axis in the memory 52 (FIG. 3).

After the rotating shaft coordinate information is read by the controller 50, the following actions are repeated up to the end of the measurement path: the rotating shaft 22 (tool body 100) is caused to reverse-rotate somewhat, to separate thereby the rake face of the cutting tool off the leading end 3*b* of the probe 3*a*; the X-axis and Y-axis are driven according to the measurement program, to cause the leading end 3*b* of the probe 3*a* to be positioned at the next measurement point on the path; and the rotating shaft 22 is caused to rotate in a direction in which the rake face of the cutting tool comes, internally, into contact with the leading end 3*b* of the probe 3*a* of the touch sensor 3; the rotating shaft coordinates at the point in time of contact detection are read by the controller 50, and path coordinate position information in the X-axis and Y-axis is stored in the memory 52.

The rotating shaft 22 (tool body 100) is caused to reverse-rotate somewhat after reading of the rotating shaft coordinate information by the controller 50. As a result, displacement from the measurement point to the next measurement point involves displacement in the X-axis and Y-axis alone. The magnitude of the angle of this reverse rotation is appropriately set, on the basis of various information items of the cutting tool, in such a manner that the PCD tip 102 that is fixed to the tool body 100 does not come into contact with the probe 3*a* of the touch sensor 3, and does not hamper measurement of the position of the rake face 101'*a* of the PCD tip 101 that is being currently measured. At the measurement points, the rotating shaft 22 is caused to rotate in the same direction for each measurement. Therefore, measurements can be performed with reduced machine error on account of backlash or the like. After measurement start, measurements can be performed by keeping constant the height position of the leading end 3*b* of the probe 3*a* of the touch sensor 3. Fast measurements become possible as a result.

FIG. 6D illustrates wire electric discharge machining at a measurement site. A cutting tool can be machined by electric discharge machining, at the position at which the rake face position is measured, through correction of the machining program using the rotating shaft coordinate information and the path coordinate position information that are acquired in accordance with the measurement program.

A device that detects the tool rake face in a contactless manner (contactless sensor), for instance a proximity sensor or a laser rangefinder, may be used instead of the touch sensor 3. If a contactless sensor is used, then a detection section (for instance the optical path of a laser beam in the case of a laser rangefinder) may be caused to move, according to a measurement program, along a line segment that is a prolongation of the measurement point, in the vertical direction. Information for regenerating the machining program can be acquired, as in the case where the touch sensor 3 is used, by measuring the distance between the contactless sensor and the rake face, and by acquiring the rotation coordinate information of the rotating shaft 22 at a time where the rake face becomes positioned at the measurement point.

An explanation follows next on the creation of the measurement program according to the present invention and on measurement of the rake face position.

<Generation of a Measurement Program>

The machining program for machining a cutting blade shape of the cutting tool is recorded in the controller 50 of the wire electric discharge machine 1, and various information items about the cutting tool are set in the controller 50. A measurement program that utilizes the touch sensor 3 is created by an analysis program in the controller 50, on the basis of the machining program and on the basis of various information items that are set. Alternatively, the measurement program may be created, by a programming device, according to a shape graphic.

Figure 7:
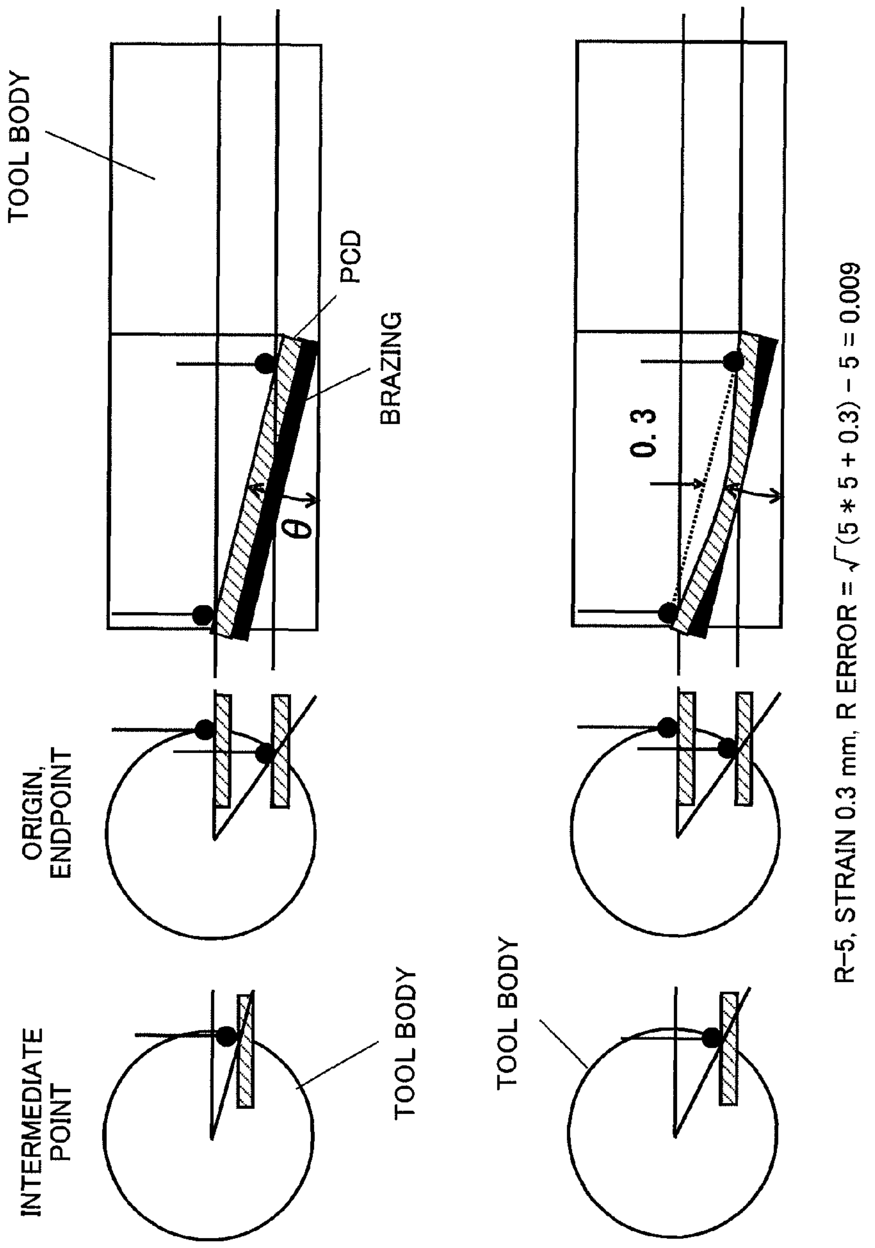
FIG. 7 is a diagram for explaining how shape precision would fail to be secured in a case where a rake face is not level but curved due to bending and strain of an mounting portion of a PCD tip, as a result, if only an origin and an endpoint of a machining program are measured and angles of a rotation shaft are determined by evenly distributing the intervals between the origin and the endpoint, then shape precision could not be secured because a rake face height at a midpoint between the origin and the endpoint would not lie on a straight line that joins the origin and the endpoint.
Figure 27:
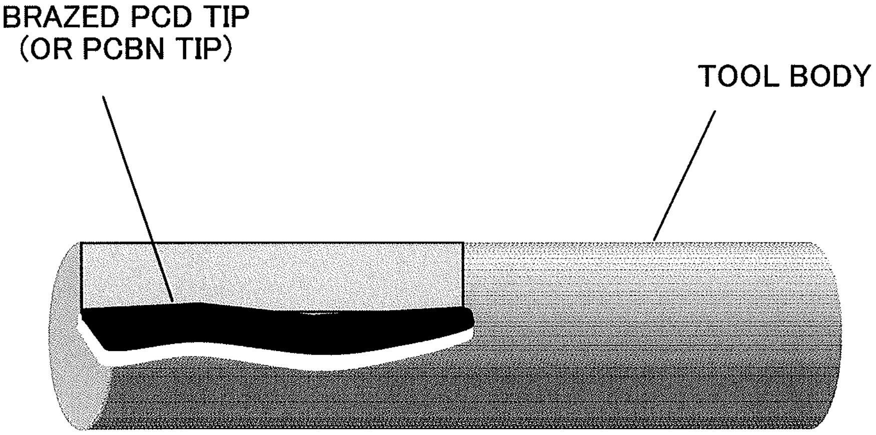
FIG. 27 is a diagram for explaining an example of curving upon brazing of a PCD tip to a tool body.
Figure 28:
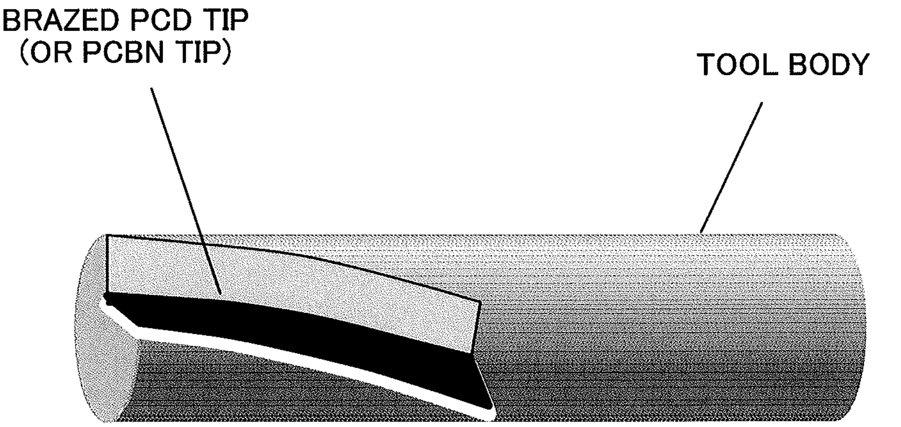
FIG. 28 is a diagram for explaining an example of a spiral PCD or PCB tool.

Even if a displacement instruction block in a machining program is a one-block linear shape instruction, multiple-point divisions are necessary in the case of measuring program, as described above. That is because bending and strain of the mounting portion of the PCD tip causes the rake face to be not level but curved (see FIG. 27). Accordingly, if only an origin and an endpoint of a machining program are measured and angles of a rotation shaft are determined by evenly distributing the intervals between the origin and the endpoint, then shape precision could not be secured because a rake face height at a midpoint between the origin and the endpoint would not lie on a straight line that joins the origin and the endpoint. For instance, in a case where a 0.3 mm curve arises at a midpoint on account of mounting strain during brazing, as illustrated in FIG. 7, a radius error of 9 μm occurs at the outer periphery of a tool having a radius of 5 mm. Such a radius error exceeds the 5 μm shape precision required by the tool, causing poor precision.

Figure 8A:
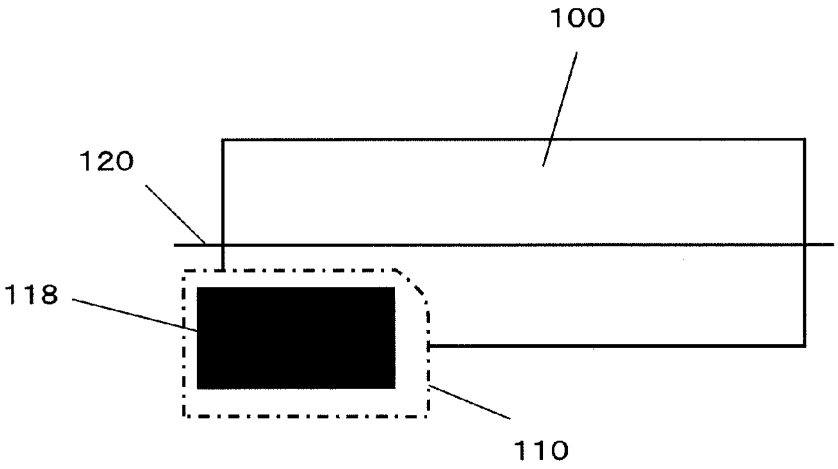
FIG. 8A and FIG. 8B are diagrams for explaining an instance where an actual machining path ordinarily cuts in from outside a cutting blade section of a cutting tool, at a machining start point, and cuts through the cutting blade section material, at the path endpoint.
Figure 8B:
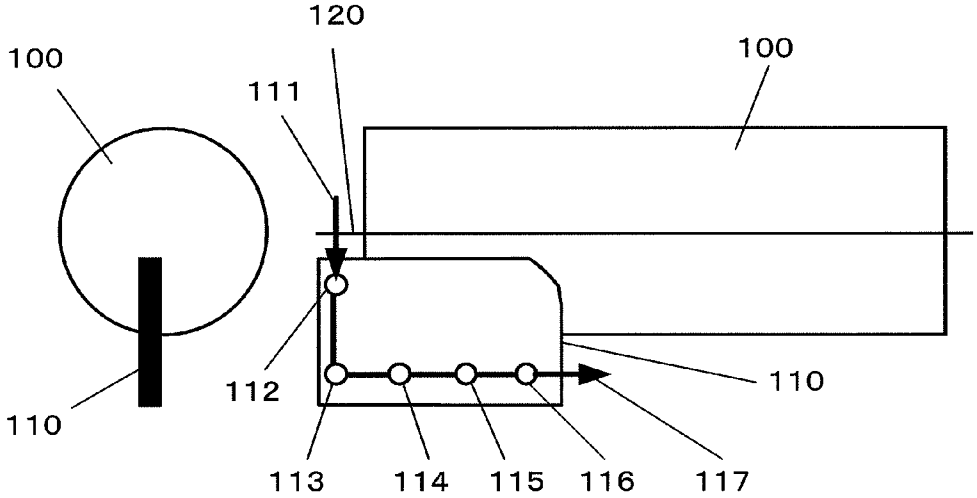

At the machining start point, as illustrated in FIG. 8B, the actual machining path ordinarily cuts in from outside a cutting blade section of the cutting tool (arrow 111), whereas, at the machining path endpoint, the actual machining path cuts through the cutting blade section material (arrow 117). As illustrated in FIG. 8A, the PCD tip 110 mounted to the tool body 100 is larger than the drawing-designated shape 118. In FIG. 8A and FIG. 8B, the reference numeral 120 denotes the rotation center axis of the tool body 100.

In cutting blade shape programming, the machining path program is ordinarily generated according to the desired cutting blade shape. However, the brazed PCD tip 110 to be formed into the cutting blade has a machining margin and a preliminary length, and the size thereof is greater than the machining path.

During programming, therefore, extension paths are respectively added to the cut-in side and to the cut-out side of the drawing-designated shape 118, as illustrated in FIG. 8B. Control is thus made possible wherein measurement points 112 to 116 are measured and, automatically, no measurement is performed at sites where there is no PCD tip stock, by not performing measurement in a cut-in path 111 and a cut-out path 117 that are added, and by determining, by program analysis in the controller 50, a created path program according to the desired cutting blade shape.

An explanation follows next, with reference to FIG. 9 and FIG. 10, on an example of creation of a measurement program based on a drawing-designated shape in a programming device.

A machining program for machining of a blade shape 130 may be used as the measurement program. Alternatively, as illustrated in FIG. 9, the measurement program for measurement, by the touch sensor 3, of the cutting blade that is mounted to the cutting tool having the blade shape 130, is generated by a programming device.

FIG. 10 is an example of a created measurement program. The meaning of the respective block instructions that make up the measurement program will be explained with reference to FIG. 9.

In response to the block instruction "G92X-5.Y-35.", the touch sensor 3 is displaced to the position of start point 131. In response to the block instruction "G90G00X-5.Y5.", the touch sensor 3 is displaced to the position of the reference numeral 132. In response to the block instruction "G01G42X0.Y5.", offset is executed in proportion to a machining margin, and the touch sensor 3 is displaced to the position of the reference numeral 133. In response to the block instruction "G01X0.Y0.", a cut-in operation is performed, and the touch sensor 3 is displaced to the position of measurement point 134.

The block instruction "G101X0.Y-10." is treated as a measurement site instruction of a straight line portion, and the touch sensor 3 is displaced up to the position of measurement point 135. The "G101" in the block instruction is a code that represents a measurement site instruction in a case where the path is a straight line. This block path is divided into a number of divisions set beforehand, measurement points are worked out, and the rake face is measured at each of the measurement points that are obtained. The number of divisions may be set arbitrarily. The measurement points may be an origin or endpoint of a displacement block, or a midpoint between the origin and the endpoint. The rake face position at each measurement point is measured in accordance with the method explained with reference to FIGS. 6*a*, 6*b*, 6*c*, 6*d*.

The block instruction "G101X10.Y-10.0." is treated as a measurement site instruction of a straight line portion, and the touch sensor 3 is displaced up to the position of measurement point 136. The path in this block is divided into a number of divisions set beforehand, measurement points are worked out, and the rake face is measured at each of the measurement points that are obtained.

The block instruction "G102X20.Y-20.10.J-10." is treated as a measurement site instruction of a circular arc portion, and the touch sensor 3 is displaced, along the locus of a circular arc, up to the position of measurement point 137. The path in this block is divided into a number of divisions set beforehand, measurement points are worked out, and the rake face is measured at each of the measurement points that are obtained.

The block instruction "G101X20.Y-30." is treated as a measurement site instruction of a straight line portion, and the touch sensor 3 is displaced up to the position of measurement point 138. The path in this block is divided into a number of divisions set beforehand, measurement points are worked out, and the rake face is measured at each of the measurement points that are obtained.

The block instruction "G101X30.Y-30." is treated as a measurement site instruction of a straight line portion, and the touch sensor 3 is displaced up to the position of measurement point 139. The path in this block is divided into a number of divisions set beforehand, measurement points are worked out, and the rake face is measured at each of the measurement points that are obtained.

In response to the block instruction "G01X35.Y-30", a cut-out operation is performed, and the touch sensor 3 is displaced up to the position of the reference numeral 140. In response to the block instruction "G00G40X35.Y-35.", offset is cancelled, and the touch sensor 3 is displaced up to the position of the reference numeral 141. In response to the block instruction "G00X-5.Y-35.", the touch sensor 3 is displaced to the start point position denoted by the reference numeral 131. Execution of the measurement program is terminated in response to "M30" block instruction.

Ordinarily, the machining program has a block that instructs cutting-in, following a block that instructs offset, and has a block that instructs cut-out prior to a block that instructs offset cancelling. When creating the measurement program in the controller 50 on the basis of the machining program, blocks between a combination of blocks of offset instruction and cut-in instruction and a combination of blocks of cut-out instruction and offset cancel instruction are blocks of measurement site instruction of the touch sensor 3. As a result, it is possible to specify which blocks are involved in measurement and which blocks are not.

When the PCD tip, which is the measurement target, is measured according to the measurement program using the wire electric discharge machine 1 provided with the touch sensor 3, the measurement is executed, using the touch sensor 3, at the position illustrated in FIG. 11.

In the measurement program of FIG. 10, the measurement site instruction block is treated as an instruction of dividing a first straight line into two, dividing a second straight line into two, dividing a circular arc into three, dividing a third straight line into two, and dividing a fourth straight line into two, as illustrated in FIG. 12. The number of divisions into which a displacement interval of the touch sensor 3 by one block of the measurement program is to be divided can be decided on the basis of, for instance, the displacement distance from the block origin (endpoint of the previous block). As a result, measurement by the touch sensor 3 at the positions of measurement points 134, 135, 136, 137, 138 and 139 (FIG. 9) is supplemented by measurement at the positions of the reference numerals 141, 142, 143, 144, 145 and 146. Data obtained through measurement at each position is stored, in the memory 52 of the controller 50, mapped to X-axis and Y-axis coordinate data (path coordinate position information) together with rotating shaft coordinate data (rotating shaft coordinate information) of the rotating shaft 22.

Figures 13, 14:
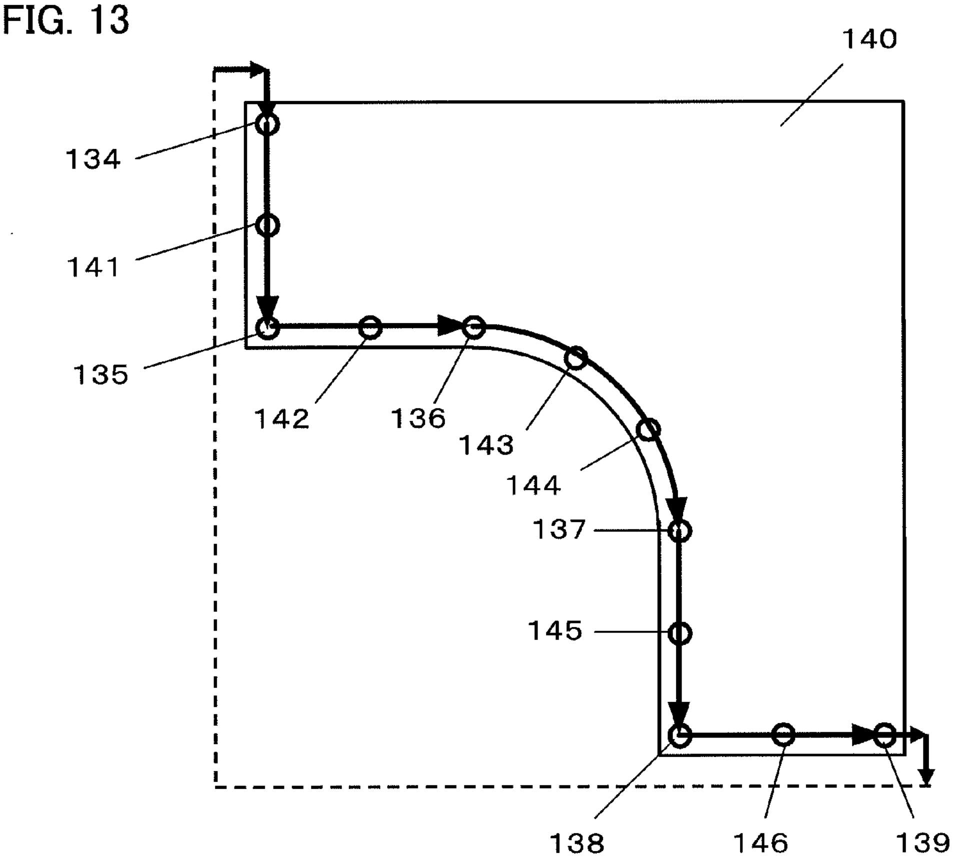
FIG. 13 is diagram for explaining a measurement locus and measurement points.
FIG. 14 is a diagram for explaining a machining program that includes rotating shaft coordinates after measurement.

The machining program is regenerated, using the acquired path coordinate position information and rotating shaft coordinate information, through execution of the above-described measurement program. FIG. 13 and FIG. 14 are diagrams for explaining an example of a machining program (regenerated machining program) that comprises rotating shaft coordinates after measurement.

The touch sensor 3 moves relatively with respect to a PCD tip 140 along a measurement locus, as illustrated in FIG. 13, the rake face position is measured at the positions of points 134, 141, 135, 142, 136, 143, 144, 137, 145, 138, 146 and 139, and the machining program is regenerated on the basis of the X-axis and Y-axis coordinate data (path coordinate position information) and the rotating shaft coordinate data (rotating shaft coordinate information) of the rotating shaft 22, as acquired by measurement and stored in the memory 52 of the controller 50.

FIG. 14 is an example of the regenerated machining program. The machining program, divided according to the measurement site instructions of the measurement program, is treated as respective one-instruction blocks, and is supplemented with instructions of the rotating shaft 22, represented by "A . . . ".

Herein, "G01X0.Y0.A10." instructs displacement up to the position of measurement point 134, in a block that instructs cut-in. The rotation amount of the rotating shaft 22 is instructed by "A10.". Further, "G01X0.Y-5.A10.1" is a displacement instruction up to the position of the reference numeral 141, "G01X0.Y-10.A10.2" is a displacement instruction up to the position of measurement point 135, "G01X5.Y-10.A12." is a displacement instruction up to the position of the reference numeral 142, "G01X10.Y-10.A14." is a displacement instruction up to the position of measurement point 136, "G02X15.Y-11.34010.J-10.A15.5" is a displacement instruction up to the position of the reference numeral 143, "G02X18.66Y-15. I-5.J-8.66A17.5" is a displacement instruction up to the position of the reference numeral 144, "G02X20.Y-20.I-8.66J-5.1A18." is a displacement instruction up to the position of measurement point 137, "G01X20.Y-25.A18.1" is a displacement instruction up to the position of the reference numeral 145, "G01X20.Y-30.A18.2" is a displacement instruction up to the position of measurement point 138, "G01X25.Y-30.A20.2" is a displacement instruction up to the position of the reference numeral 146, and "G01X30.Y-30.A22.2" is a displacement instruction up to the position of measurement point 139.

Figures 15, 16:
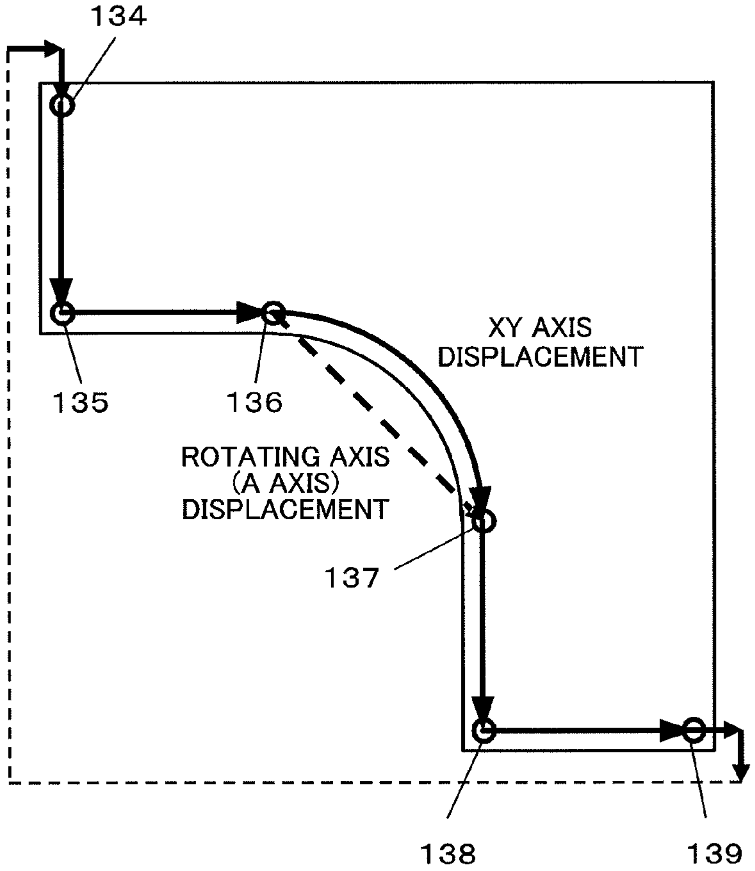
FIG. 15 is a diagram for explaining measurement points of a machining program that includes rotating shaft coordinates, in a case where a displacement interval of a touch sensor by one block is not divided.
FIG. 16 is a diagram for explaining a machining program that includes rotating shaft coordinates, in a case where a displacement interval of a touch sensor by one block is not divided.

FIG. 15 is a diagram for explaining measurement points of a machining program that includes rotating shaft coordinates in a case where the displacement interval of the touch sensor 3 by one block is not divided into a plurality of intervals. FIG. 16 is a diagram for explaining a machining program that includes rotating shaft coordinates in a case where such divisions are not made.

An interval of a circular arc-shaped machining path from measurement point 136 to measurement point 137 is machined by circular interpolation. If dividing and measuring of the interval is not performed, the expanse between the origin (position of measurement point 136) and the endpoint (position of measurement point 137) of the circular arc is subjected to linear interpolation. Consequently, the rotation angle in the vicinity of the center of the machining path in this case is different from the rotation angle obtained in the case where circular interpolation is carried out from the position of measurement point 136 up to the position of measurement point 137. Therefore, it becomes necessary to divide the circular arc-shaped machining path into several sections, as explained with reference to FIG. 11, FIG. 12, FIG. 13 and FIG. 14, and measure the position that corresponds to the rake face of the cutting blade as obtained through machining of the PCD tip 140.

In order to simplify the description of the program, the explanation of the embodiment includes no taper angle instruction for imparting a relief angle to the cutting blade edge section, i.e. an instruction for machining a flank by tilting the wire electrode according to the instructed angle. However, a taper machining instruction is added to the path in the actual machining program, and hence the flank can be machined properly according to the instructed angle.

In the program for measurement that includes a taper machining instruction, the taper machining instruction is ignored in instructions G101, G102 and G103 in the instruction portion of measurement using the touch sensor 3, and the attitude of the touch sensor 3 mounted to the upper wire guide, is oriented vertically with respect to the horizontal plane, relative to the path. Herein, G101 is a linear interpolation instruction, and G102 is an instruction for measurement by clockwise circular interpolation and G103 by counter-clockwise circular interpolation.

After measurement using the touch sensor 3, the taper machining instruction remains as-is in the regenerated machining program that is created on the basis of the coordinate data measured according to the measurement program. During machining, the flank is thus properly machined, at the relief angle, through tilting of the wire electrode.

Figures 19, 20:
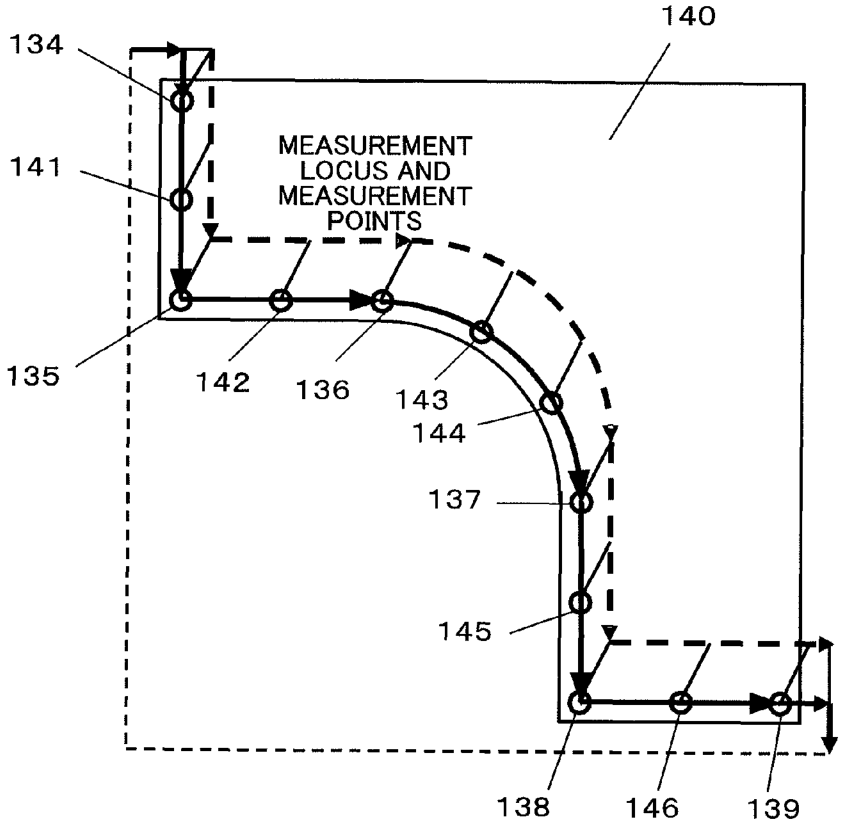
FIG. 19 is a diagram for explaining a measurement locus and measurement points in the case of a machining program (with a taper machining instruction) that includes rotating shaft coordinates after measurement.
FIG. 20 is a diagram for explaining a machining program (taper machining instruction) that includes rotating shaft coordinates after measurement.

FIG. 17 and FIG. 18 illustrate an example of a measurement program that includes a taper machining instruction, and FIG. 19 and FIG. 20 illustrate an example of a machining program that includes a taper machining instruction. The broken line in FIG. 17 denotes the locus on the rear side of the blade shape 130 in an instance where the wire electrode 2 moves while tilted according to the taper machining instruction. The broken line in FIG. 19 denotes a measurement locus and a measurement point in the machining program (with a taper machining instruction) that includes rotating shaft coordinates regenerated using coordinate data that is obtained by measurement as explained with reference to FIG. 17 and FIG. 18. FIG. 20 is a diagram for explaining the machining program (taper machining instruction) that includes the regenerated rotating shaft coordinates.

The program illustrated in FIG. 18, which corresponds to the program illustrated in FIG. 10, is a program in which a taper machining instruction is added to the program illustrated in FIG. 10. The machining program that includes regenerated rotating shaft coordinates illustrated in FIG. 20 is a program in which a taper instruction is added to the machining program illustrated in FIG. 14.

As explained above, the wire electric discharge machining method and wire electric discharge machine according to the present invention make it possible to machine, easily and with high precision, ultra-hard cutting tools, for instance made of PCD or PCBN, that have complex shapes. For measurement, by using a touch sensor, along the path of a machining shape of a cutting tool, a program for measurement in which the touch sensor is used is automatically created if there is a CNC program for tool shape machining, not incurring the trouble of cumbersome measurement program for the touch sensor. Then, by performing measurement based on the measurement program, a new machining program is created. As a result, the burden of the operator can be reduced significantly. By performing measurement, by way of the touch sensor, at fine-division points on the path along which the cutting blade is machined, it becomes possible to directly measure curving that arises from rake face mounting error and from brazing, as well as height error by misalignment. As a result, the cutting blade section can be finished with higher shape precision.

Figure 21:
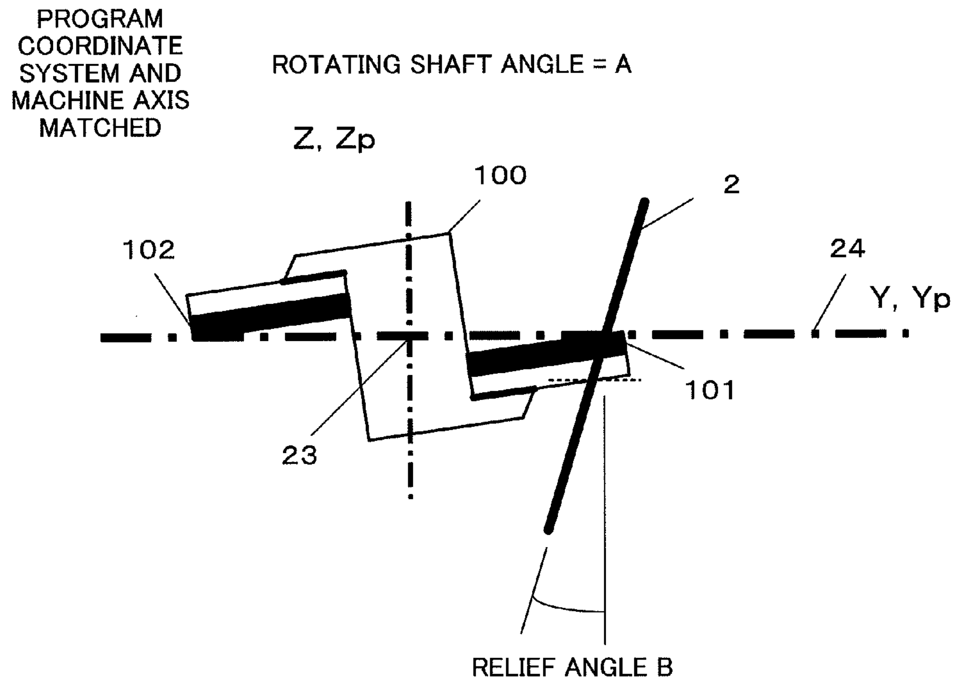
FIG. 21 is a diagram for explaining taper machining of a cutting blade section flank.
Figure 22:
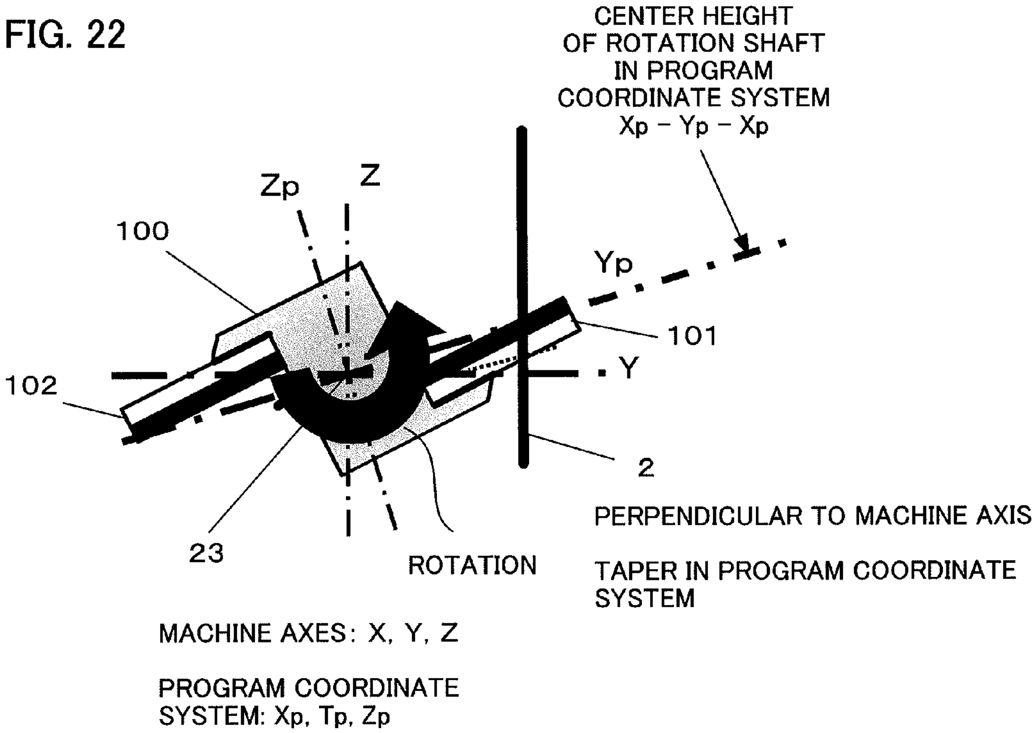
FIG. 22 is a diagram for explaining tilting of a program coordinate system in a rotating shaft direction.
Figure 23A:
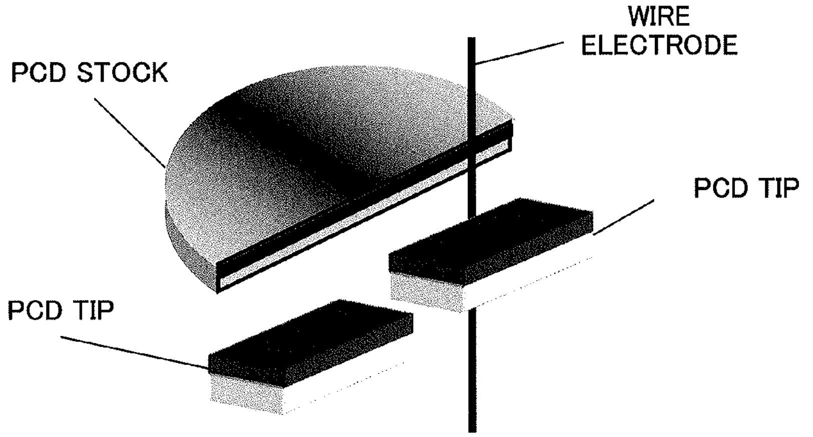
FIG. 23A and FIG. 23B are diagrams for explaining an example of cutting (blanking) of tips out of PCD stock (disc)
Figure 23B:
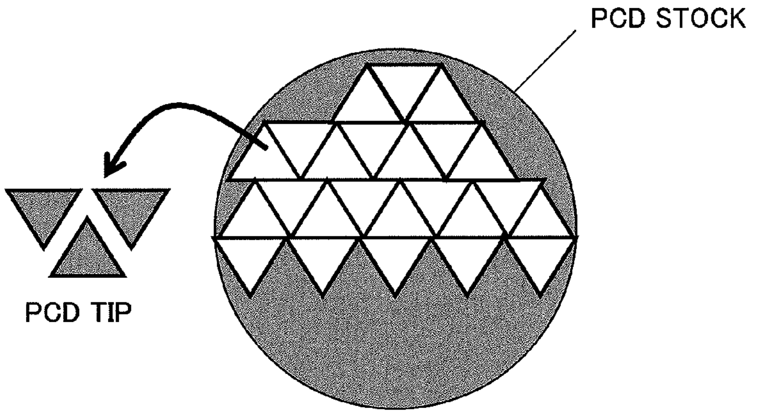
Figure 24:
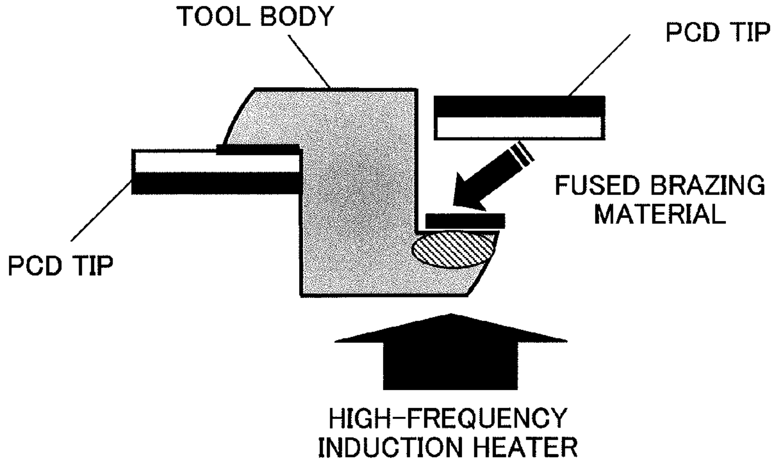
FIG. 24 is a diagram for explaining an example of brazing of a PCD tip to a tool body.
Figure 25:
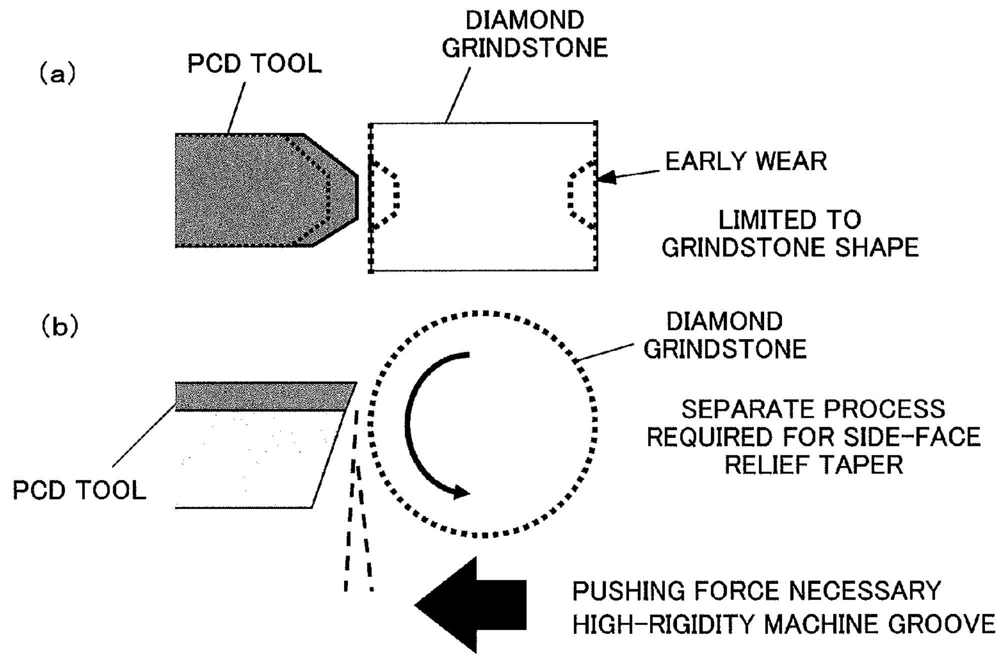
FIGS. 25*a* and 25*b* are diagrams for explaining machining of a tool by grinding
Figure 26A:
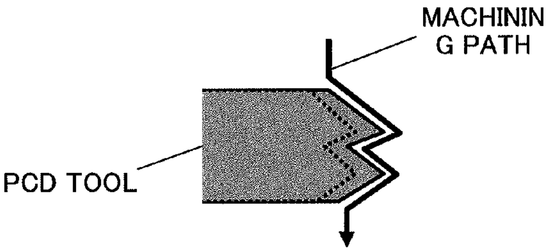
FIG. 26A and FIG. 26B are diagrams for explaining machining of a tool by wire electric discharge machining.
Figure 26B:
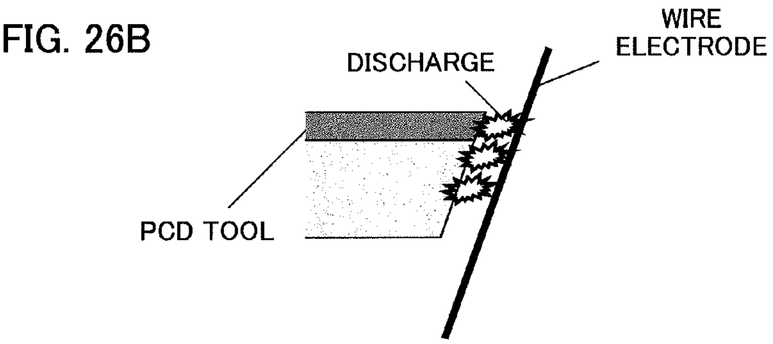

Concerning the angle at which the rotating shaft is tilted with respect to rotation direction during the above-described taper machining of the cutting blade section flank as illustrated in FIG. 21, an Xp-Yp-Zp coordinate system of the program coordinate system is tilted, in the rotation direction of the rotating shaft 22 having a center axis that is parallel to an Xp-axis or a Yp-axis, by coordinate transformation, as illustrated in FIG. 22. Accordingly, control of taper machining that involves tilting the wire electrode 2 is active on the machining program. However, the angle of the rotating shaft 22 is corrected in an actual operation of the wire electric discharge machine, and hence it becomes possible to perform machining by disposing the wire electrode 2 vertically (vertically with respect to the X-Y plane) relative to the rotation direction of the rotating shaft.

What is claimed is:

1. A method of forming, by wire electric discharging machining, an ultra-hard material that is fixed to a cutting tool into a cutting blade according to a machining program executed by a wire electric discharge machine performing a taper machining, wherein the wire electric discharge machine comprises:

upper and lower wire guides, a wire electrode, the cutting tool movable relatively, in two mutually orthogonal axis directions, with respect to the wire electrode that is stretched by the upper wire guide and the lower wire guide, a touch sensor, a rotating shaft to which the cutting tool is removably mounted, and a controller, the method comprising:

generating a measurement program for setting, along a machining path instructed by the machining program, measurement points at which contact between a face of the ultra-hard material and a probe end section of the touch sensor is detected at a rotation center height of the rotating shaft, said measurement points including an origin of a block of the machining path, an endpoint of the block of the machining path, and a point among a plurality of divisional positions between the origin and the endpoint;

wherein each of the measurement points is calculated by separating a path that is offset by a machining margin, from the machining path instructed by the machining program, the machining path has a plurality of blocks including said block, and the measurement points among the plurality of divisional positions are obtained by automatically calculating, by the controller, points resulting from dividing, by an arbitrary number of divisions, an expanse from an endpoint coordinate of each of the blocks in the machining path instructed by the machining program up to an endpoint coordinate of a previous block among the plurality of blocks in the machining path, for each of the measurement points, positioning the probe end section of the touch sensor at the measurement point on the basis of the generated measurement program, causing the rotating shaft, to which the cutting tool is mounted, to rotate in a direction in which the face of the ultra-hard material being fixed to the cutting tool comes into contact with the probe end section of the touch sensor, said face defining a tool rake face, reading rotating shaft coordinate information of the rotating shaft for which the face of the ultra-hard material at the measurement point is at the rotation center height of the rotating shaft, on the basis of a detection signal obtained from the touch sensor when the face of the ultra-hard material comes into contact with the probe end section of the touch sensor, and storing (i) path coordinate position information, being coordinate data in the two orthogonal axes at the measurement point, as well as (ii) the read rotating shaft coordinate information;

regenerating a machining program from the path coordinate position information and the rotating shaft coordinate information that are stored for each of the measurement points; and forming a cutting blade through wire electric discharge machining of the ultra-hard material by the wire electrode that is stretched by the upper and lower wire guides, according to the regenerated machining program.

2. The method according to claim 1, wherein the taper machining includes performing machining by tilting the wire electrode, by a taper angle, with respect to a plane in which the two axes extend, or by rotating the rotating shaft by a taper angle to make the wire electrode perpendicular to the plane in which the two axes extend.

3. The method according to claim 1, wherein for each block among the plurality of blocks, no measurement is performed when an origin of the block of the machining path instructed by the machining program is a cut-in start point in a cut-in path from outside the ultra-hard material, or an endpoint of a cut-out path extending out of the ultra-hard material.

4. A method of forming, by wire electric discharge machining, an ultra-hard material that is fixed to a cutting tool into a cutting blade according to a machining program executed by a wire electric discharge machine performing a taper machining, wherein the wire electric discharge machine comprises:

upper and lower wire guides, a wire electrode, the cutting tool movable relatively, in two mutually orthogonal axis directions, with respect to the wire electrode that is stretched by the upper wire guide and the lower wire guide, a contactless-type sensor, a controller, and a rotating shaft to which the cutting tool is removably mounted, and the method comprising:

generating a measurement program for setting, along a machining path instructed by the machining program, measurement points;

detecting, by the contactless-type sensor, a face of the ultra-hard material in a contactless manner;

positioning a detection section of the contactless-type sensor at each of the measurement points, said measurement points including an origin of a block of the machining path, an endpoint of the block of the machining path, and a point among a plurality of divisional positions between the origin and the endpoint;

wherein each of the measurement points is calculated by separating a path that is offset by a machining margin, from the machining path instructed by the machining program, the machining path has a plurality of blocks including said block, and the measurement points among the plurality of divisional positions are obtained by automatically calculating, in the controller, points resulting from dividing, by an arbitrary number of divisions, an expanse from an endpoint coordinate of each of the blocks in the machining path instructed by the machining program up to an endpoint coordinate of a previous block among the plurality of blocks in the machining path;

for each of the measurement points, causing the rotating shaft to rotate until the face of the ultra-hard material is at a rotation center height of the rotating shaft on the basis of a detected value outputted by the contactless-type sensor, said face of the ultra-hard material defining a tool rake face; and reading rotating shaft coordinate information of the rotating shaft, and storing the rotating shaft coordinate information and path coordinate position information obtained at the measurement point;

regenerating a machining program from the rotating shaft coordinate information and the path coordinate position information that are stored for each of the measurement points; and forming a cutting blade through wire electric discharge machining of the ultra-hard material by the wire electrode that is stretched by the upper and lower wire guides, according to the regenerated machining program.

5. A wire electric discharge machine, comprising:

a rotating shaft;

upper and lower wire guides;

a wire electrode;

a cutting tool that is removably mounted to the rotating shaft and is movable relatively, in two mutually orthogonal axis directions, with respect to the wire electrode that is stretched by the upper wire guide and the lower wire guide; and a touch sensor, wherein the cutting tool is configured to hold an ultra-hard material that is to be formed into a cutting blade by wire electric discharge machining according to a machining program executable by the wire electric discharge machine, the wire electric discharge machine being configured to perform a taper machining and further comprising:

a measurement program generation unit;

a positioning unit;

a rotation unit;

a reading unit;

a storage unit;

a controller; and a machining program regeneration unit, wherein the measurement program generation unit is configured to generate a measurement program for setting, along a machining path instructed by the machining program, measurement points at which contact between a face of the ultra-hard material and a probe end section of the touch sensor is detected at a rotation center height of the rotating shaft, said measurement points including an origin of a block of the machining path, an endpoint of the block of the machining path, and a point among a plurality of divisional positions between the origin and the endpoint;

the controller is configured to calculate each of the measurement points by separating a path that is offset by a machining margin, from the machining path instructed by the machining program, the machining path has a plurality of blocks including said block, the controller is configured to automatically calculate points resulting from dividing, by an arbitrary number of divisions, an expanse from an endpoint coordinate of each of the blocks in the machining path instructed by the machining program up to an endpoint coordinate of a previous block among the plurality of blocks to obtain the measurement points among the plurality of divisional positions;

the positioning unit is configured to position the probe end section of the touch sensor at each of the measurement points on the basis of the generated measurement program;

the rotation unit is configured to cause the rotating shaft, to which the cutting tool is mounted, to rotate in a direction in which the face of the ultra-hard material being fixed to the cutting tool, comes into contact with the probe end section of the touch sensor, said face of the ultra-hard material defining a tool rake face;

the reading unit is configured to read rotating shaft coordinate information of the rotating shaft for which the face of the ultra-hard material at each of the measurement points is at the rotation center height of the rotating shaft, on the basis of a detection signal obtained from the touch sensor obtained when the face of the ultra-hard material comes into contact with the probe end section of the touch sensor;

the storage unit is configured to store (i) path coordinate position information, being coordinate data in the two orthogonal axes at each of the measurement points, as well as (ii) the rotating shaft coordinate information read by the reading unit; and the machining program regeneration unit is configured to regenerate a machining program from the path coordinate position information and the rotating shaft coordinate information that are stored in the storage unit for each of the measurement points;

wherein the wire electric discharge machine is configured to perform wire electric discharge machining on the ultra-hard material to form the cutting blade by the wire electrode that is stretched by the upper and lower wire guides, according to the machining program regenerated by the machining program regeneration unit.

6. The wire electric discharge machine according to claim 5, wherein the wire electric discharge machine is configured to perform taper machining by tilting the wire electrode, by a taper angle, with respect to a plane in which the two axes extend, or by rotating the rotating shaft by a taper angle to make the wire electrode perpendicular to the plane in which the two axes extend.

7. The wire electric discharge machine according to claim 5, wherein for each block among the plurality of blocks, the measurement program generation unit is configured not to perform measurement when an origin of said block of the machining path instructed by the machining program is a cut-in start point in a cut-in path outside the ultra-hard material, or an endpoint in a cut-out path extending out of the ultra-hard material.

8. A wire electric discharge machine, comprising:

a rotating shaft;

upper and lower wire guide;

a wire electrode;

a cutting tool that is removably mounted to the rotating shaft and is movable relatively, in two mutually orthogonal axis directions, with respect to the wire electrode that is stretched by the upper wire guide and the lower wire guide, wherein the cutting tool is configured to hold an ultra-hard material that is to be formed into a cutting blade by wire electric discharge machining according to a machining program executable by the wire electric discharge machine, and a contactless-type sensor configured to detect a face of the ultra-hard material in a contactless manner, said face of the ultra-hard material defining a tool rake face, the wire electric discharge machine being configured to perform a taper machining and further comprising:

a measurement program generation unit;

a positioning unit;

a rotation unit;

a reading unit;

a storage unit;

a controller; and a machining program regeneration unit, wherein the measurement program generation unit is configured to generate a measurement program for setting, along a machining path instructed by the machining program, measurement points including an origin of a block of the machining path, an endpoint of the block of the machining path, and a point among a plurality of divisional positions between the origin and the endpoint;

the controller is configured to calculate each of the measurement points by separating a path that is offset by a machining margin, from the machining path instructed by the machining program, the machining path has a plurality of blocks including said block, the controller is configured to automatically calculate points resulting from dividing, by an arbitrary number of divisions, an expanse from an endpoint coordinate of each of the blocks in the machining path instructed by the machining program up to an endpoint coordinate of a previous block among the plurality of blocks to obtain the measurement points among the plurality of divisional positions, the positioning unit is configured to position a detection section of the contactless-type sensor at each of the measurement points, the rotation unit is configured to cause the rotating shaft to rotate until the face of the ultra-hard material is at a rotation center height of the rotating shaft on the basis of a detected value outputted by the contactless-type sensor, the storage unit is configured to read rotating shaft coordinate information of the rotating shaft, and store the rotating shaft coordinate information and path coordinate position information obtained at each of the measurement points, the machining program regeneration unit is configured to regenerate a machining program from the rotating shaft coordinate information and path coordinate position information that are stored in the storage unit for each of the measurement points, and the wire electric discharge machine is configured to perform wire electric discharge machining on the ultra-hard material to form the cutting blade by the wire electrode that is stretched by the upper and lower wire guides, according to the machining program regenerated by the machining program regeneration unit.

* * * * *